(12) United States Patent
Couture et al.

(10) Patent No.: US 7,639,460 B2
(45) Date of Patent: Dec. 29, 2009

(54) SWITCHING APPARATUS AND METHOD FOR VARYING AN IMPEDANCE OF A PHASE LINE OF A SEGMENT OF AN ELECTRICAL POWER LINE

(75) Inventors: Pierre Couture, Boucherville (CA); Jacques Leduc, Ste-Julie (CA)

(73) Assignee: Hydro-Quebec, Montreal, Quebec (CA)

( * ) Notice: Subject to any disclaimer, the term of this patent is extended or adjusted under 35 U.S.C. 154(b) by 376 days.

(21) Appl. No.: 11/628,028

(22) PCT Filed: Jun. 3, 2005

(86) PCT No.: PCT/CA2005/000864

§ 371 (c)(1),
(2), (4) Date: Nov. 30, 2006

(87) PCT Pub. No.: WO2005/119875

PCT Pub. Date: Dec. 15, 2005

(65) Prior Publication Data

US 2008/0061632 A1    Mar. 13, 2008

(30) Foreign Application Priority Data

Jun. 4, 2004    (CA) .................................. 2469778

(51) Int. Cl.
*H02H 3/00*    (2006.01)
(52) U.S. Cl. .............................................. 361/2; 361/6
(58) Field of Classification Search .................. 361/2, 361/3, 5, 6, 115
See application file for complete search history.

(56) References Cited

U.S. PATENT DOCUMENTS

| 4,999,565 | A | 3/1991 | Nilsson |
| 6,018,152 | A | 1/2000 | Allaire et al. |
| 6,198,062 | B1* | 3/2001 | Mather et al. ................ 218/152 |
| 6,396,172 | B1 | 5/2002 | Couture |
| 6,486,569 | B2* | 11/2002 | Couture ......................... 307/98 |
| 6,498,315 | B1* | 12/2002 | Betz et al. .................... 218/120 |
| 6,952,102 | B2* | 10/2005 | Sakaki et al. ................ 324/460 |
| 7,174,261 | B2* | 2/2007 | Gunn et al. .................... 702/62 |

FOREIGN PATENT DOCUMENTS

| EP | 0 439 953 A2 | 8/1991 |
| WO | 00/35061 A1 | 6/2000 |
| WO | 02/41459 A1 | 5/2002 |

OTHER PUBLICATIONS

International Search Report dated Sep. 28, 2005.
International Preliminary Report on Patentability dated Aug. 14, 2006.

* cited by examiner

*Primary Examiner*—Danny Nguyen
(74) *Attorney, Agent, or Firm*—Buchanan Ingersoll & Rooney PC

(57) ABSTRACT

The switching apparatus and the method are for varying the impedance of a phase line of a segment of an electrical power line. The phase line includes n conductors electrically insulated from each other and short-circuited together at two ends of the segment. The apparatus comprises at least one first vacuum interrupter connected in series with at least one of the conductors; at least one first controllable motor for selectively opening and closing the at least one first vacuum interrupter; a detector for detecting a parameter representative of current operating conditions of the phase line; and a controller for controlling the at least one first controllable motor according to the parameter detected by the detector.

36 Claims, 38 Drawing Sheets

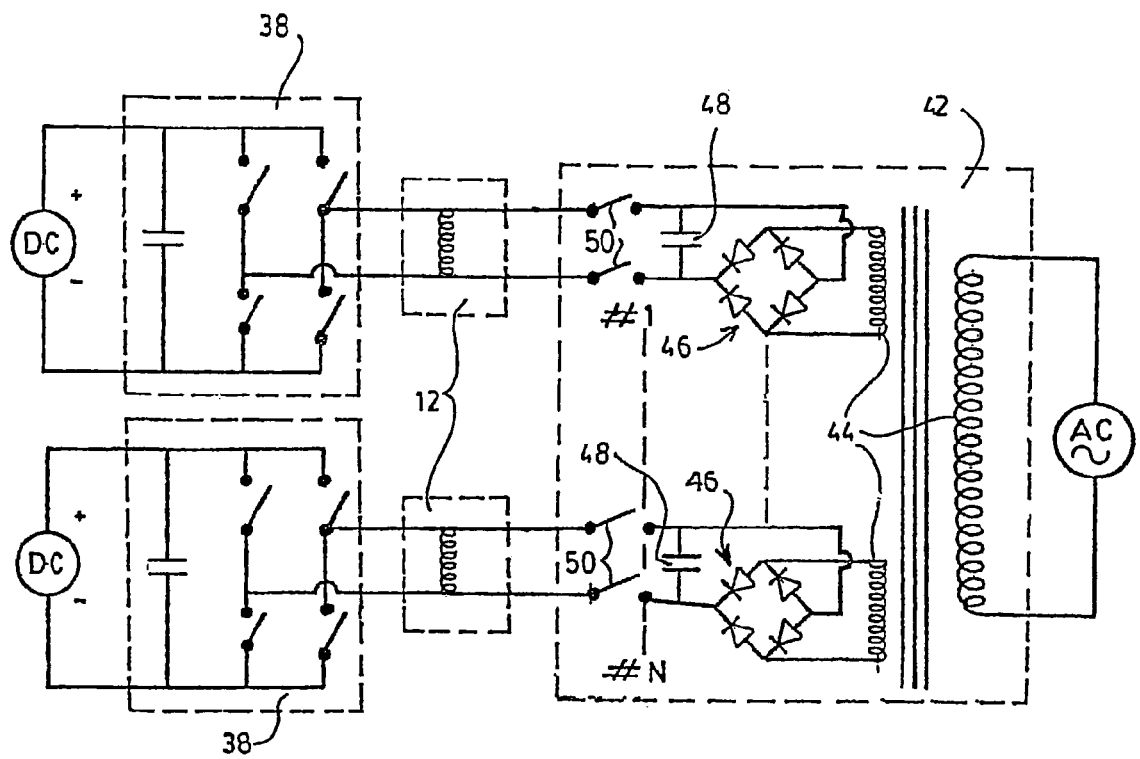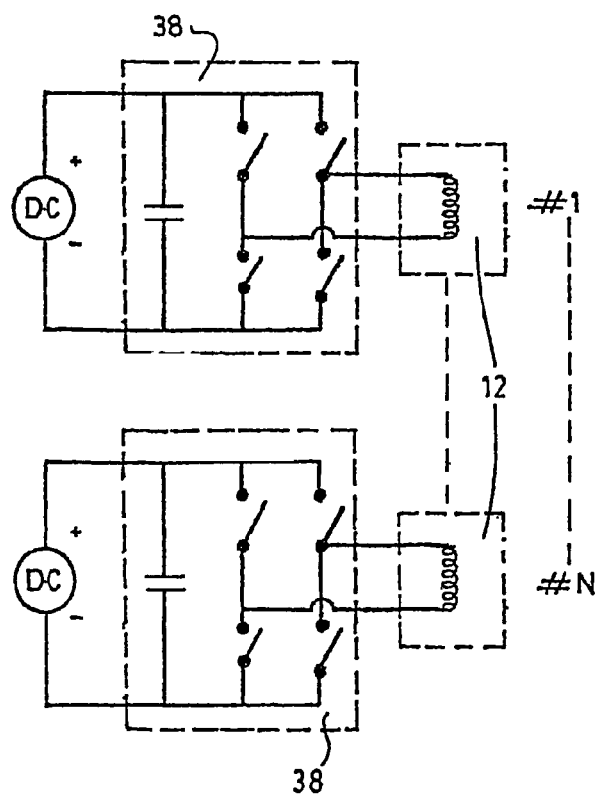
FIG. 6

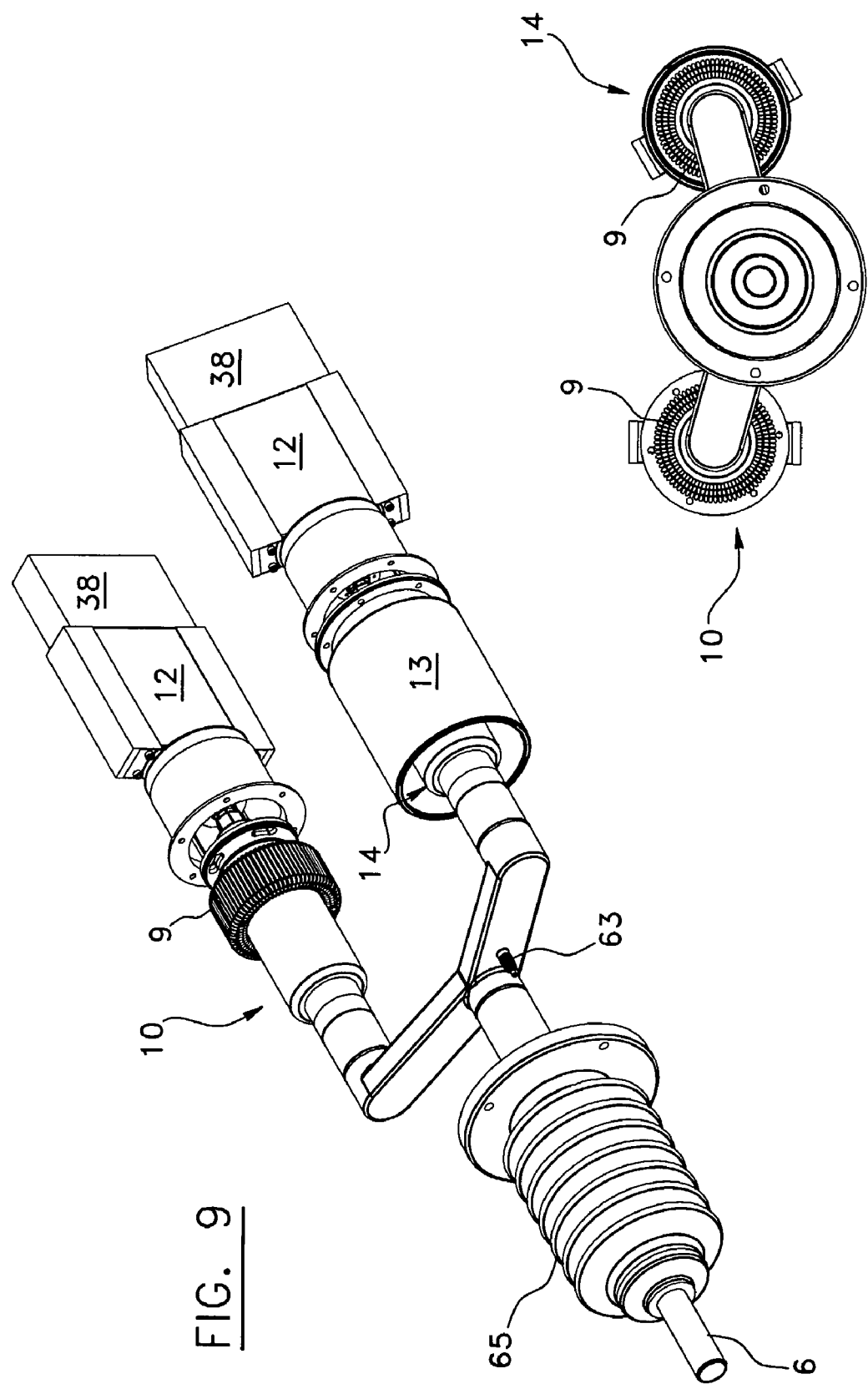

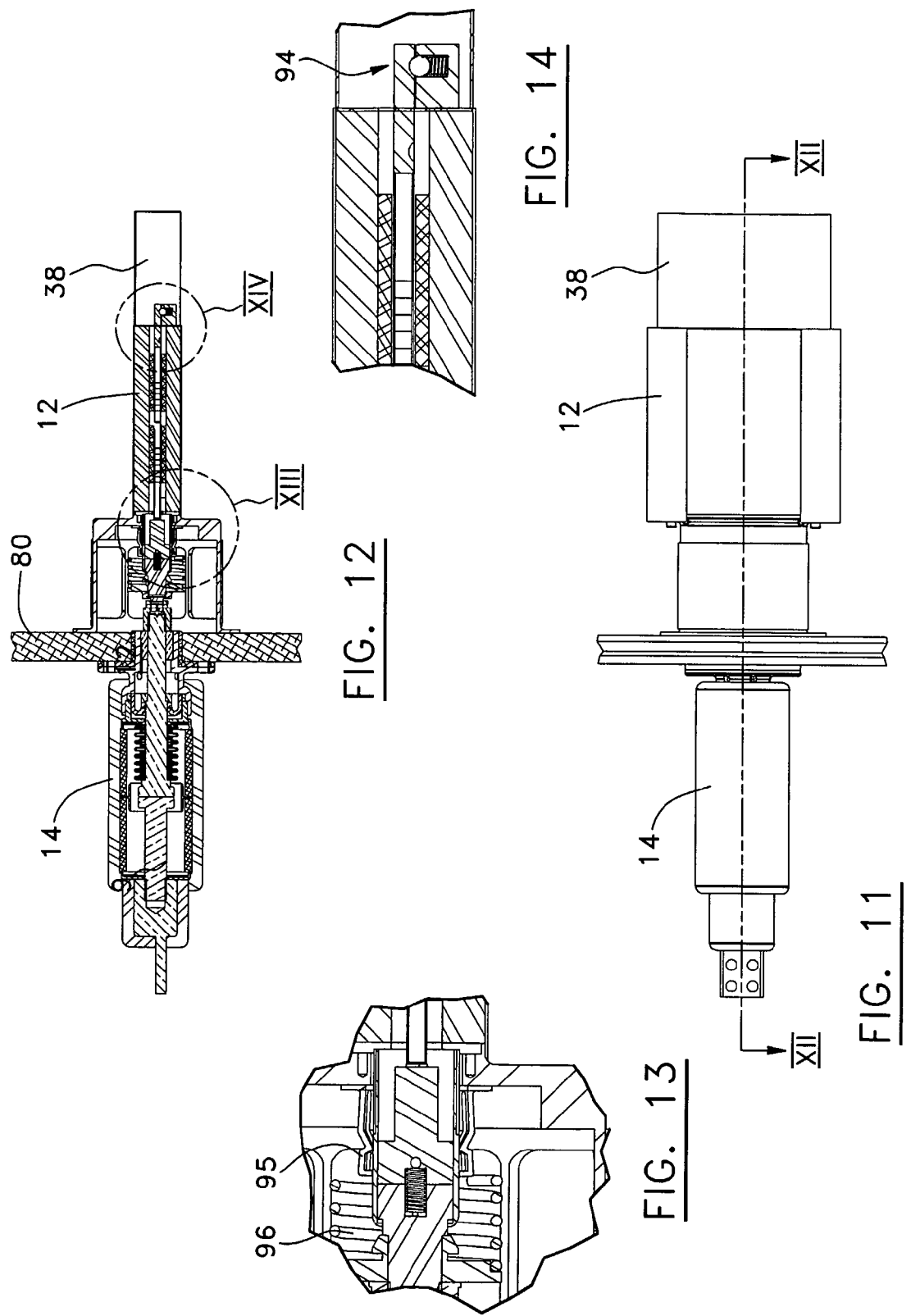

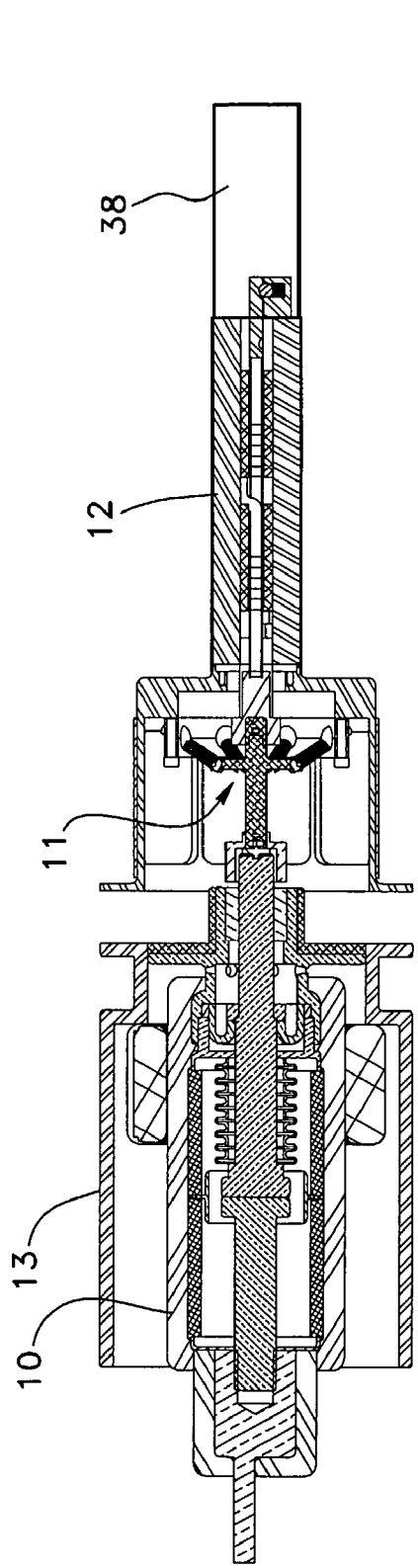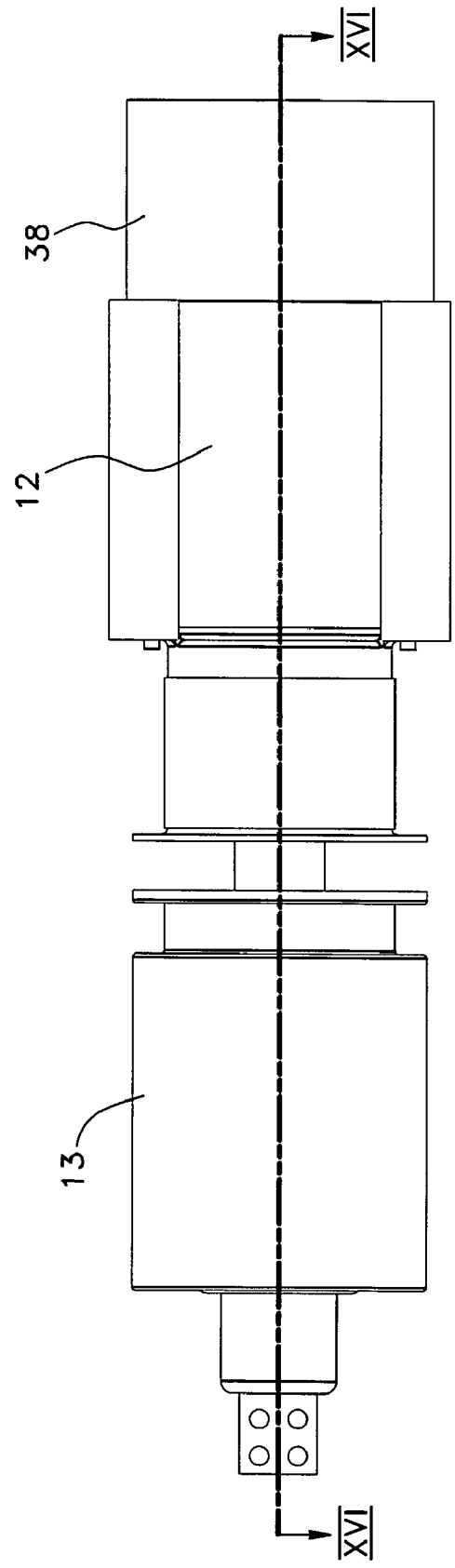
FIG. 16
FIG. 15

SWITCHING APPARATUS AND METHOD FOR VARYING AN IMPEDANCE OF A PHASE LINE OF A SEGMENT OF AN ELECTRICAL POWER LINE

FIELD OF THE INVENTION

The present invention relates to a switching apparatus and a method for varying an impedance of a phase line of a segment of an electrical power line. The phase line includes n conductors electrically insulated from each other and short-circuited together at two ends of the segment. More generally, the switching apparatus and the method are operated, without ground or phase reference, from a 735 high voltage power line but the invention can be applied to any bundled high voltage line.

BACKGROUND OF THE INVENTION

Known in the art there is the U.S. Pat. No. 6,396,172 and the PCT application published under the international publication no. WO 02/41459. In these documents, there is described a switching apparatus intended to be used with a segment of an electrical power line having several phase lines. Each of the phase lines has several conductors electrically insulated one from each other and connected in parallel. The conductors of each phase line are short-circuited together at the extremities of the segment. The apparatus comprises pairs of switches connected in parallel, for selectively opening and closing the conductors of each phase line, a detecting device for detecting current operating conditions of the segment, and a controlling device for controlling the pairs of switches according to the current operating conditions of the segment.

An object of the present invention is to provide a switching apparatus and a method that are more secure, more efficient and less expensive than what is described in the prior art.

SUMMARY OF THE INVENTION

According to the present invention, there is provided a switching apparatus for varying an impedance of a phase line of a segment of an electrical power line, the phase line including n conductors electrically insulated from each other and short-circuited together at two ends of the segment, the apparatus comprising: at least one first vacuum interrupter connected in series with at least one of the conductors; at least one first controllable motor for selectively opening and closing the at least one first vacuum interrupter; a detector for detecting a parameter representative of current operating conditions of the phase line; and a controller for controlling the at least one first controllable motor according to the parameter detected by the detector.

According to the present invention, there is also provided a method for varying an impedance of a phase line of a segment of an electrical power line, the phase line including n conductors electrically insulated from each other and short-circuited together at two ends of the segment, the method comprising steps of: a) providing at least one first vacuum interrupter connected in series with at least one of the conductors; b) providing at least one first controllable motor for selectively opening and closing the at least one first vacuum interrupter; c) detecting a parameter representative of current operating conditions of the phase line; and d) controlling the at least one first controllable motor according to the parameter detected in step c).

BRIEF DESCRIPTION OF THE FIGURES

FIG. 6 is a circuit diagram illustrating parts of the apparatus according to a preferred embodiment of the present invention;

FIG. 9 is a side perspective view of elements shown in FIGS. 7 and 8;

FIG. 10 is a front view of what is shown in FIG. 9;

FIG. 11 is a side view of elements shown in FIGS. 7 and 8;

FIG. 12 is a cross-section view along section A-A of FIG. 11;

FIG. 13 is an enlarged view of a portion of FIG. 12;

FIG. 14 is an enlarged view of another portion of FIG. 12;

FIG. 15 is a side view of elements shown in FIGS. 7 and 8;

FIG. 16 is a cross-section view along section A-A of FIG. 15;

DETAILED DESCRIPTION OF THE FIGURES

Figure 1:
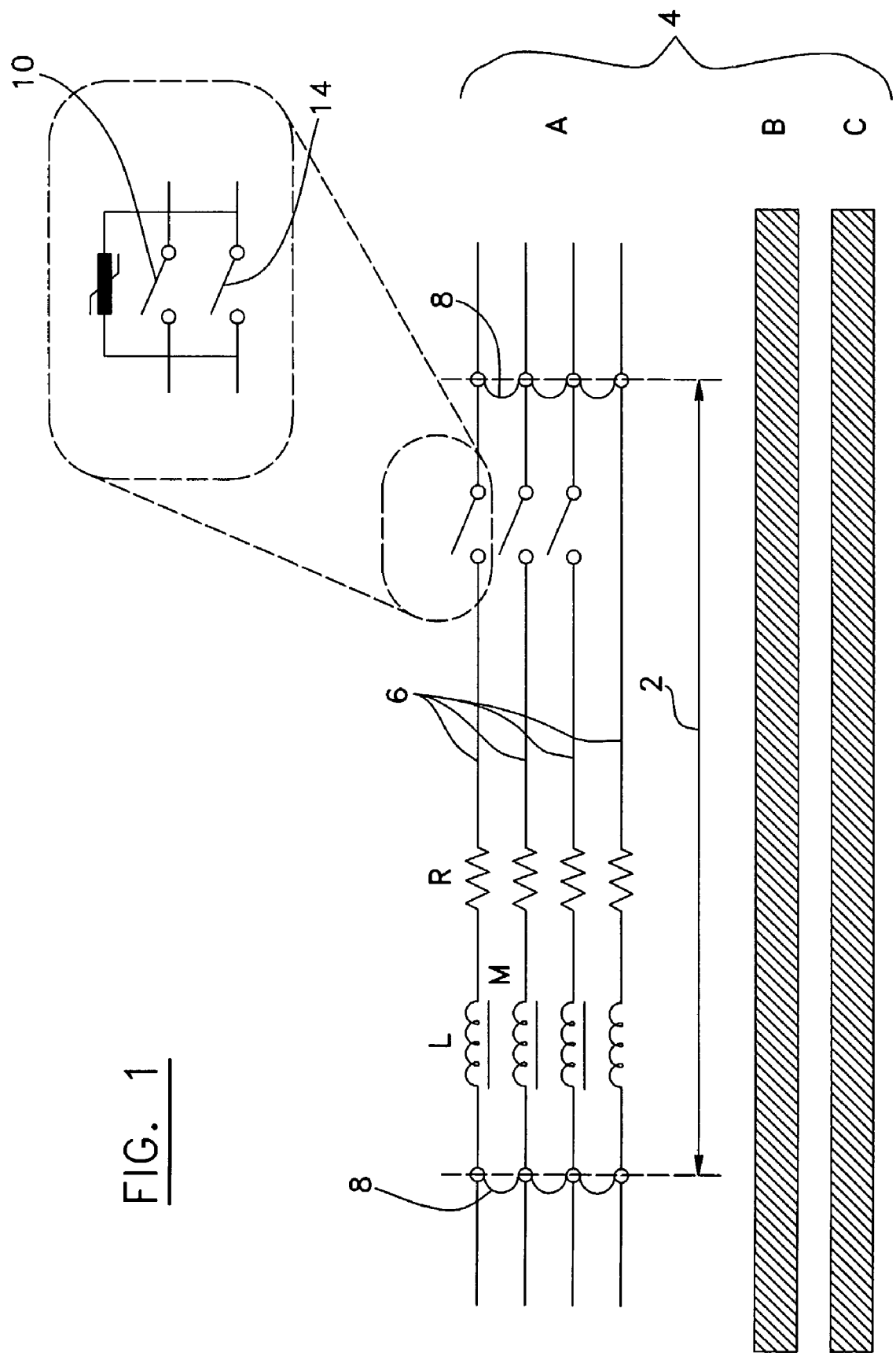
FIG. 1 is a schematic view of a segment of a an electrical power line, provided with an apparatus according to a preferred embodiment of the present invention.

In the drawings, the cables linking the different elements of the switching apparatus, the sensors and the command cards of the electronic switches are not shown.

Figure 7:
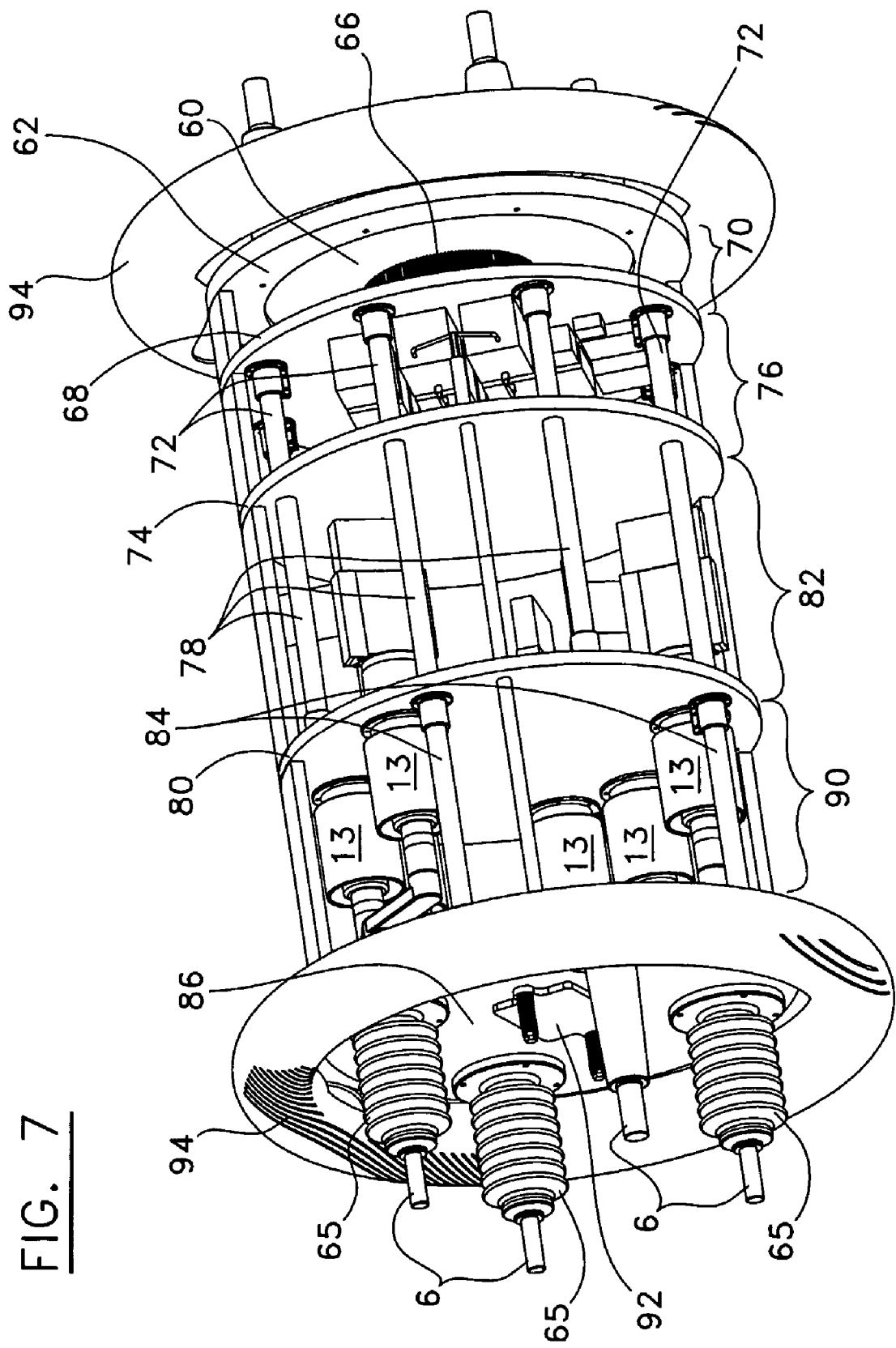
FIG. 7 is a side perspective view of an apparatus according to a preferred embodiment of the present invention.
Figure 8:
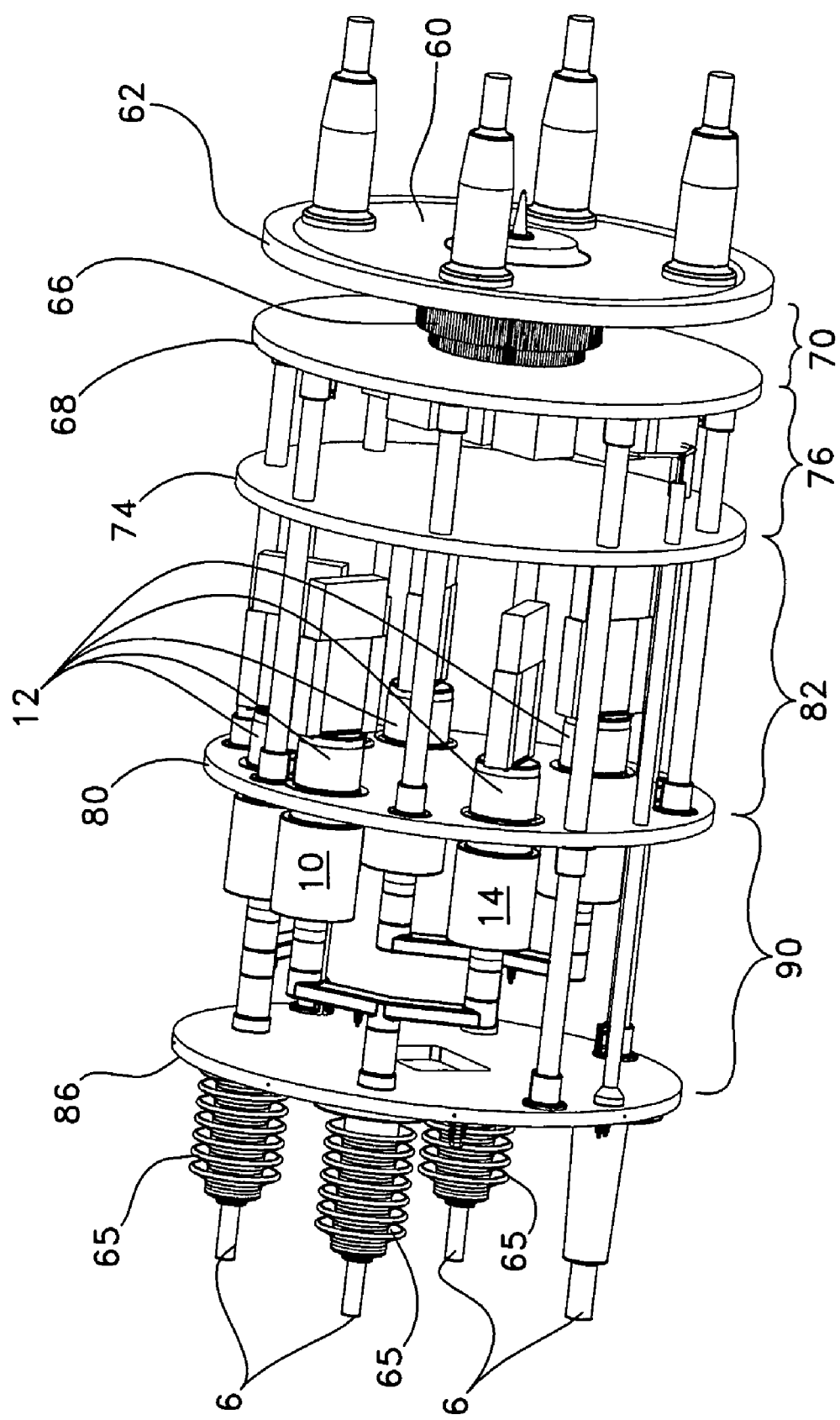
FIG. 8 is another side perspective view of the apparatus shown in FIG. 7.
Figure 24:
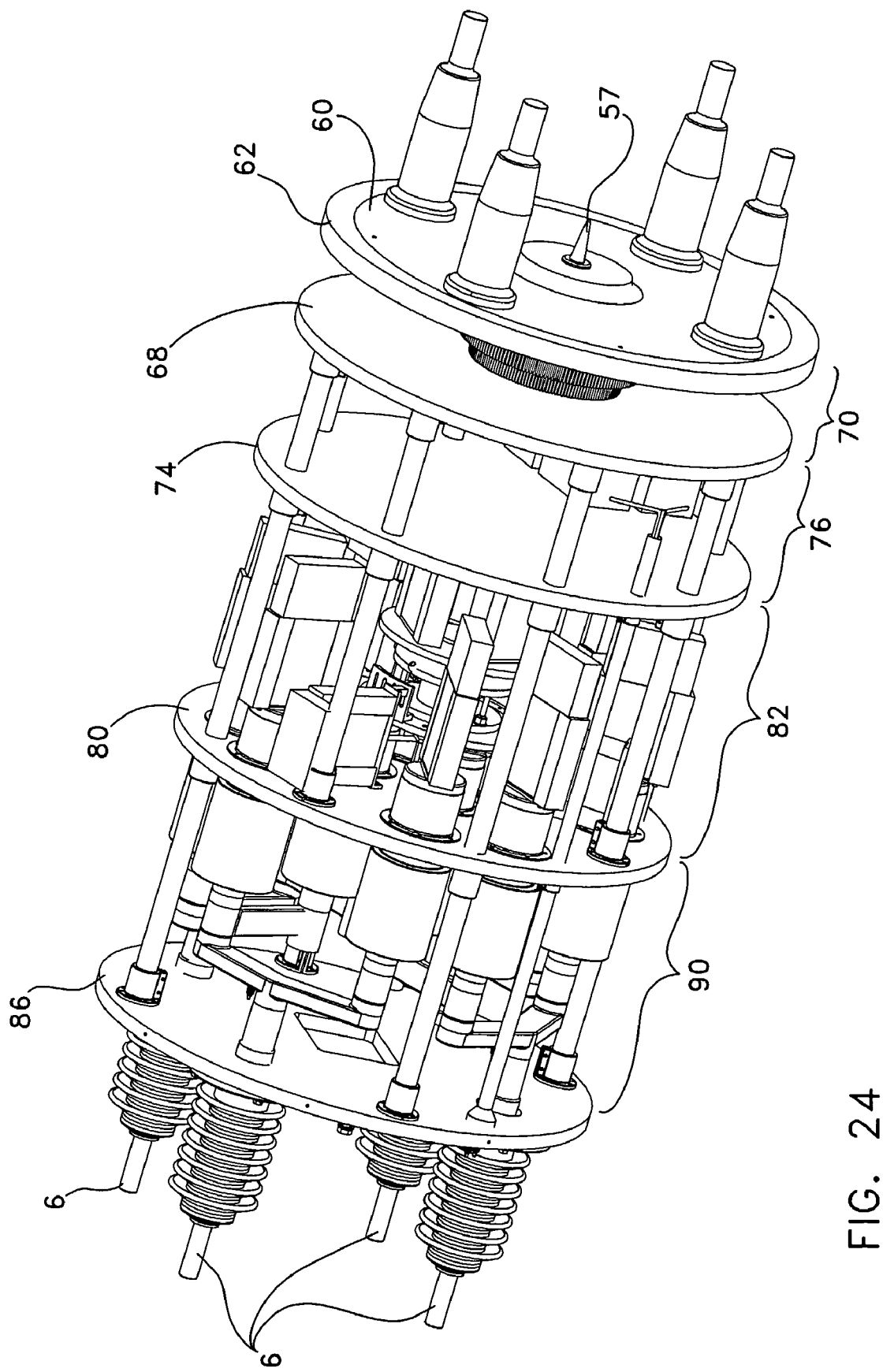
FIG. 24 is a side perspective view of another preferred embodiment of the present invention.
Figure 25:
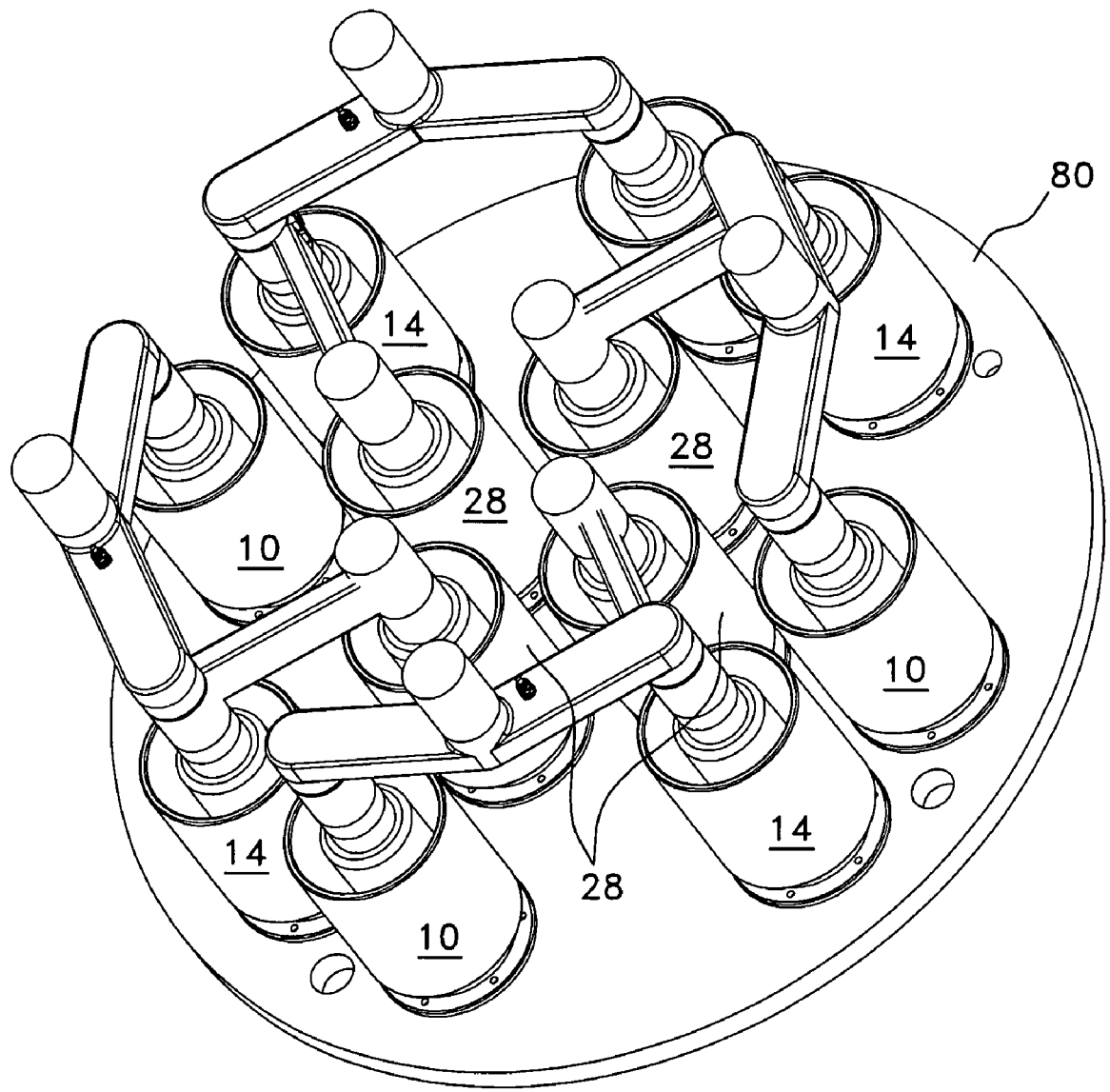
FIG. 25 is a front perspective view of elements shown in FIG. 24.
Figure 26:
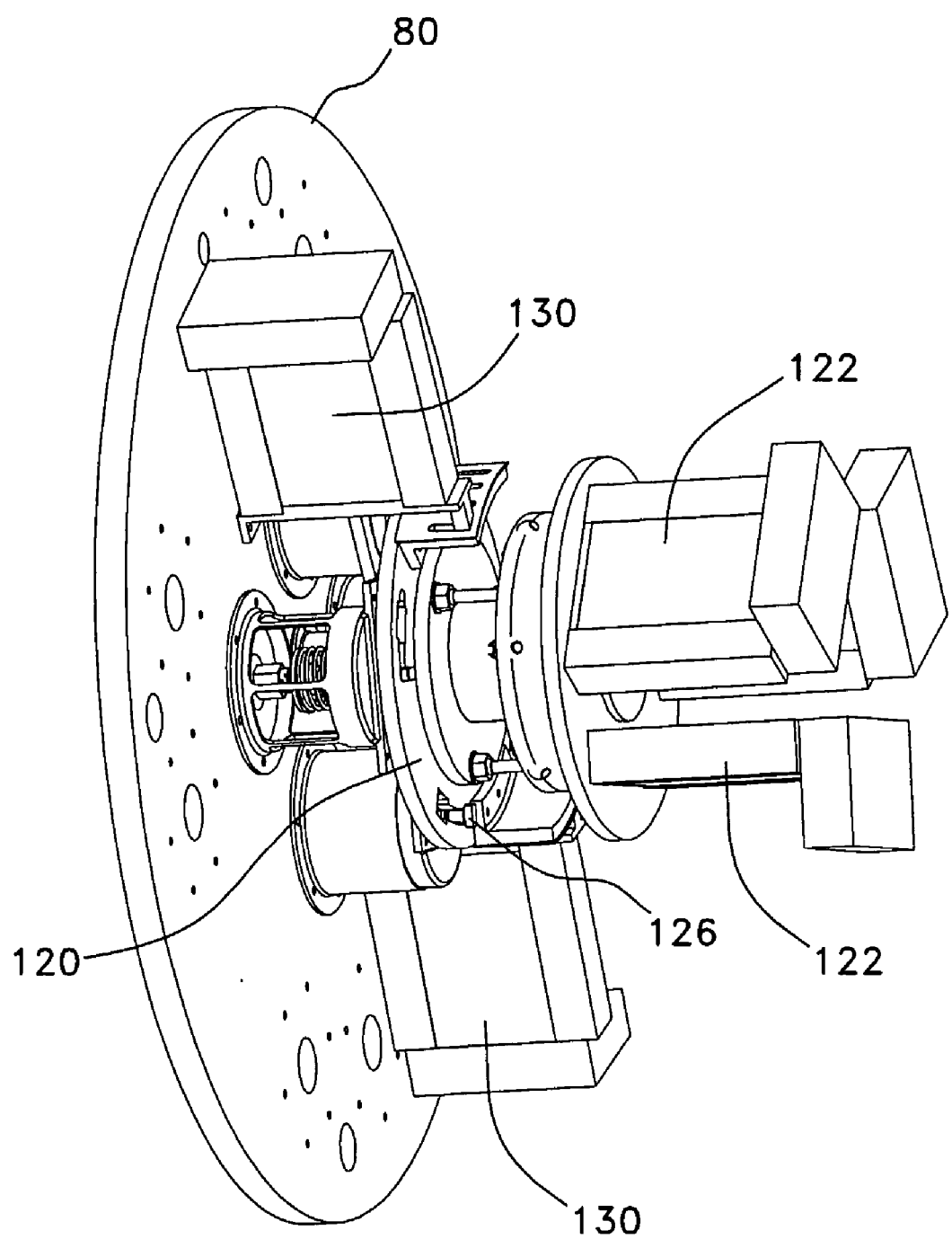
FIG. 26 is a side perspective view of elements shown in FIG. 24.
Figure 28:
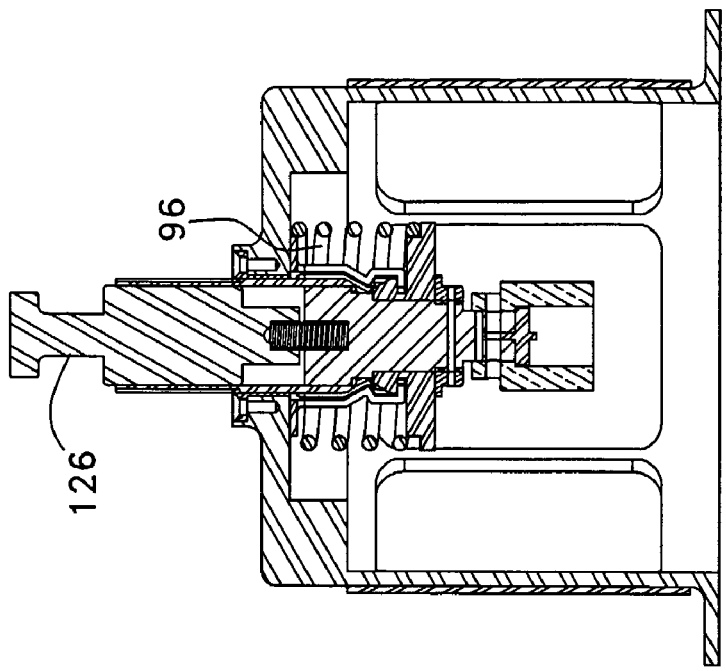
FIG. 28 is a cross-section view along section A-A of FIG. 27.
Figure 27:
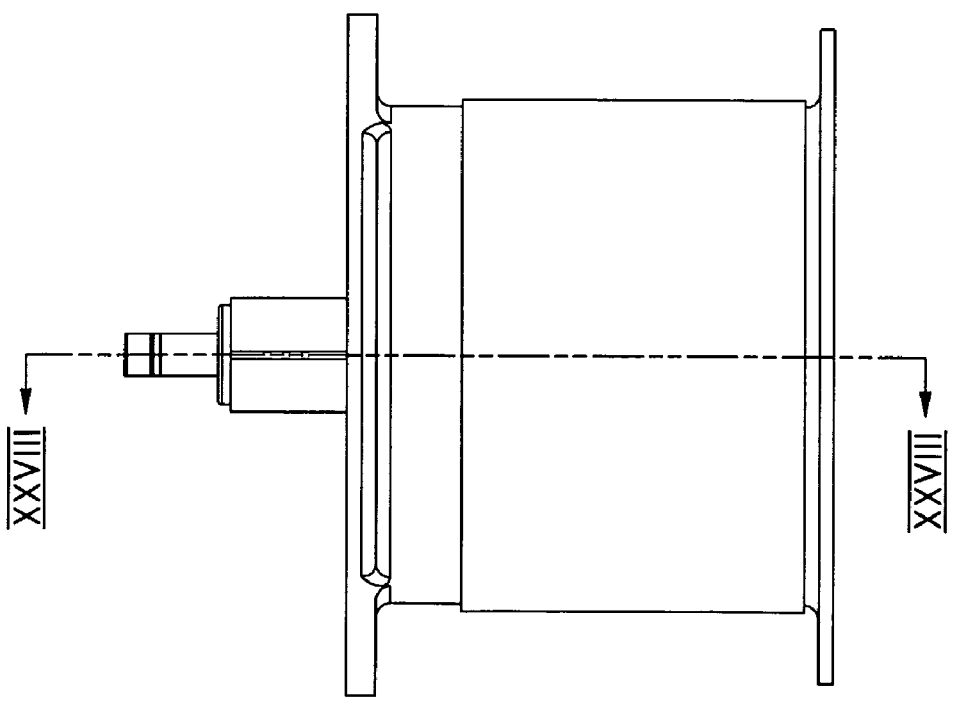
FIG. 27 is a side view of elements shown in FIG. 24.
Figure 29:
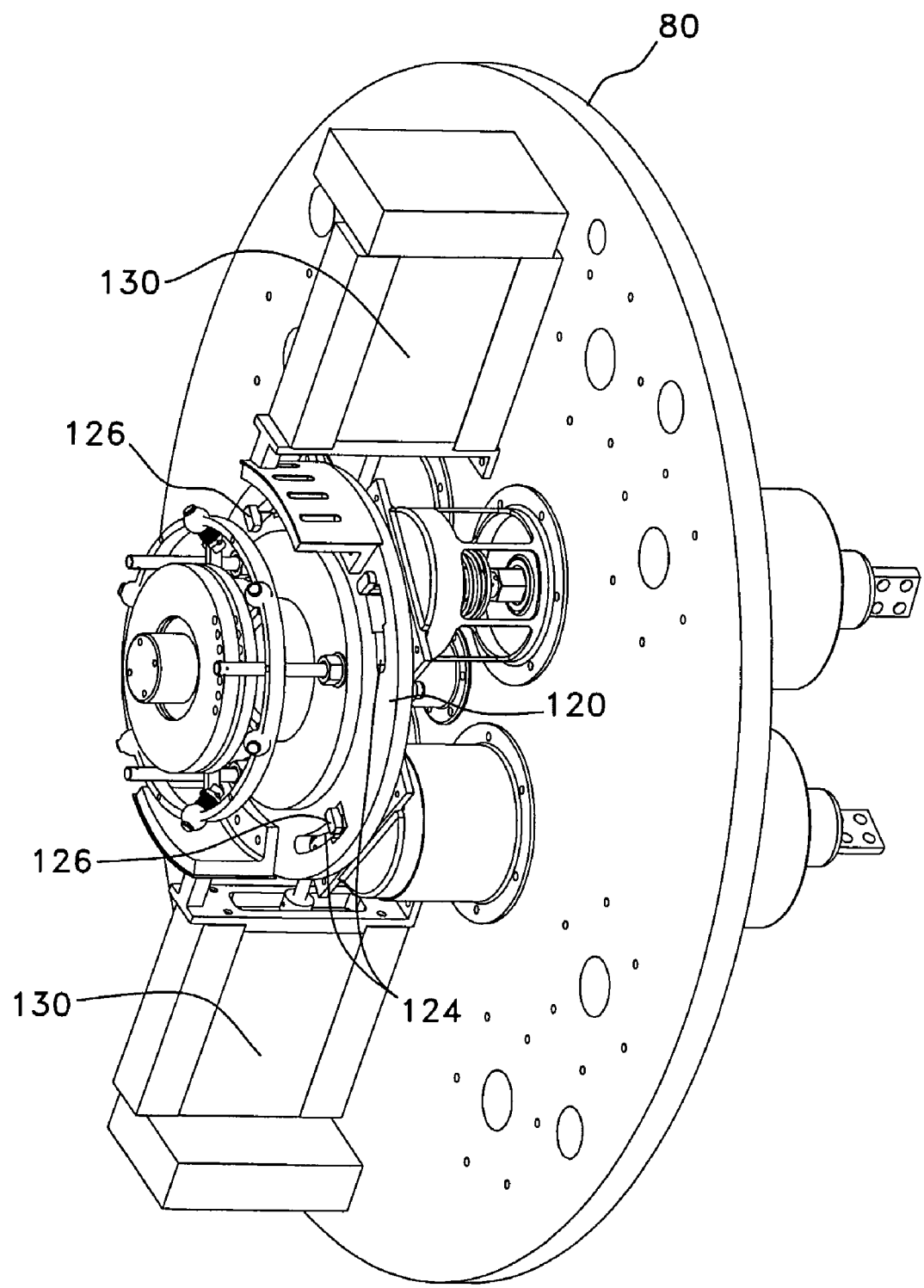
FIG. 29 is a side view of elements shown in FIG. 24.
Figure 30:
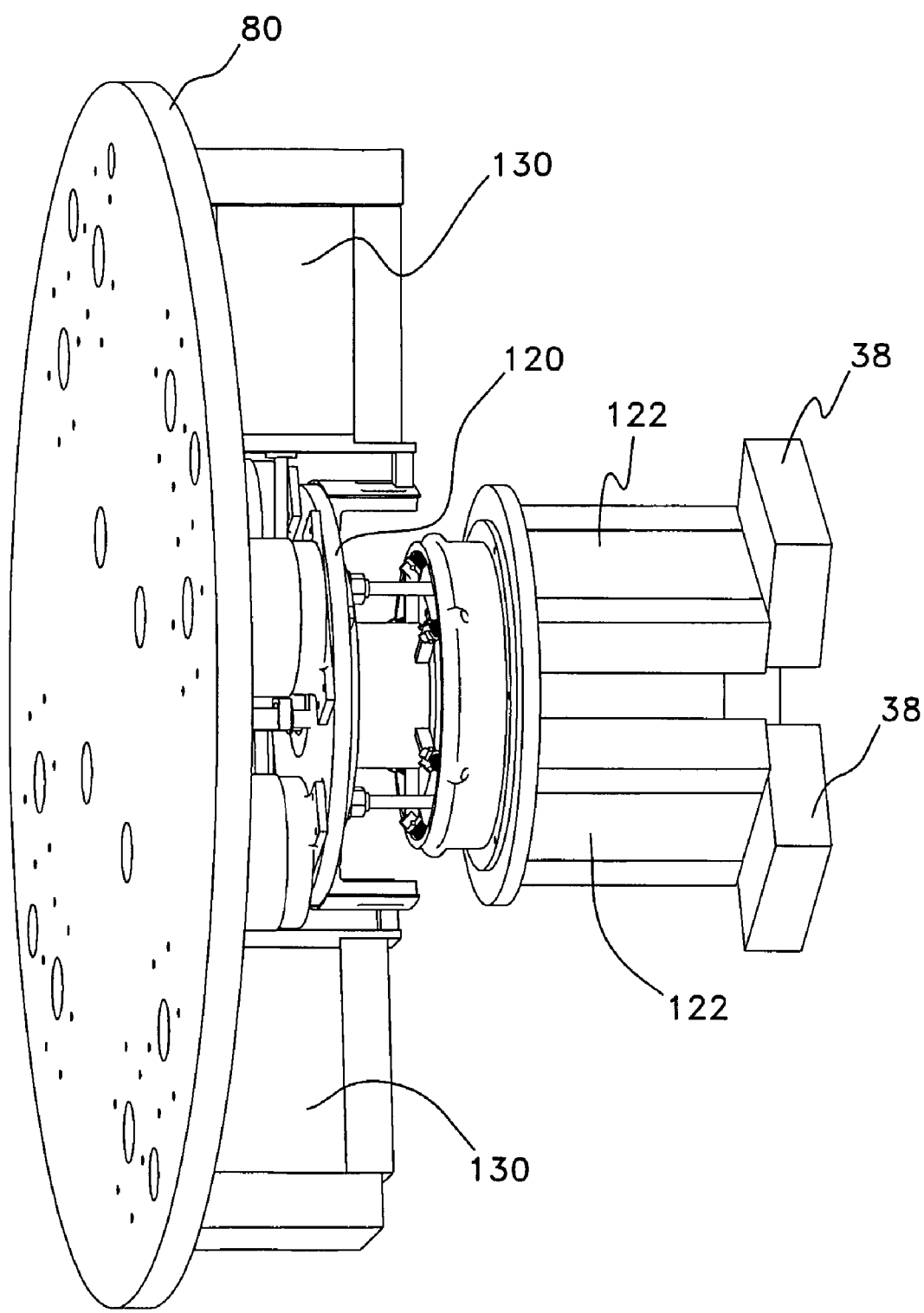
FIG. 30 is a side view of elements shown in FIG. 24.
Figure 31:
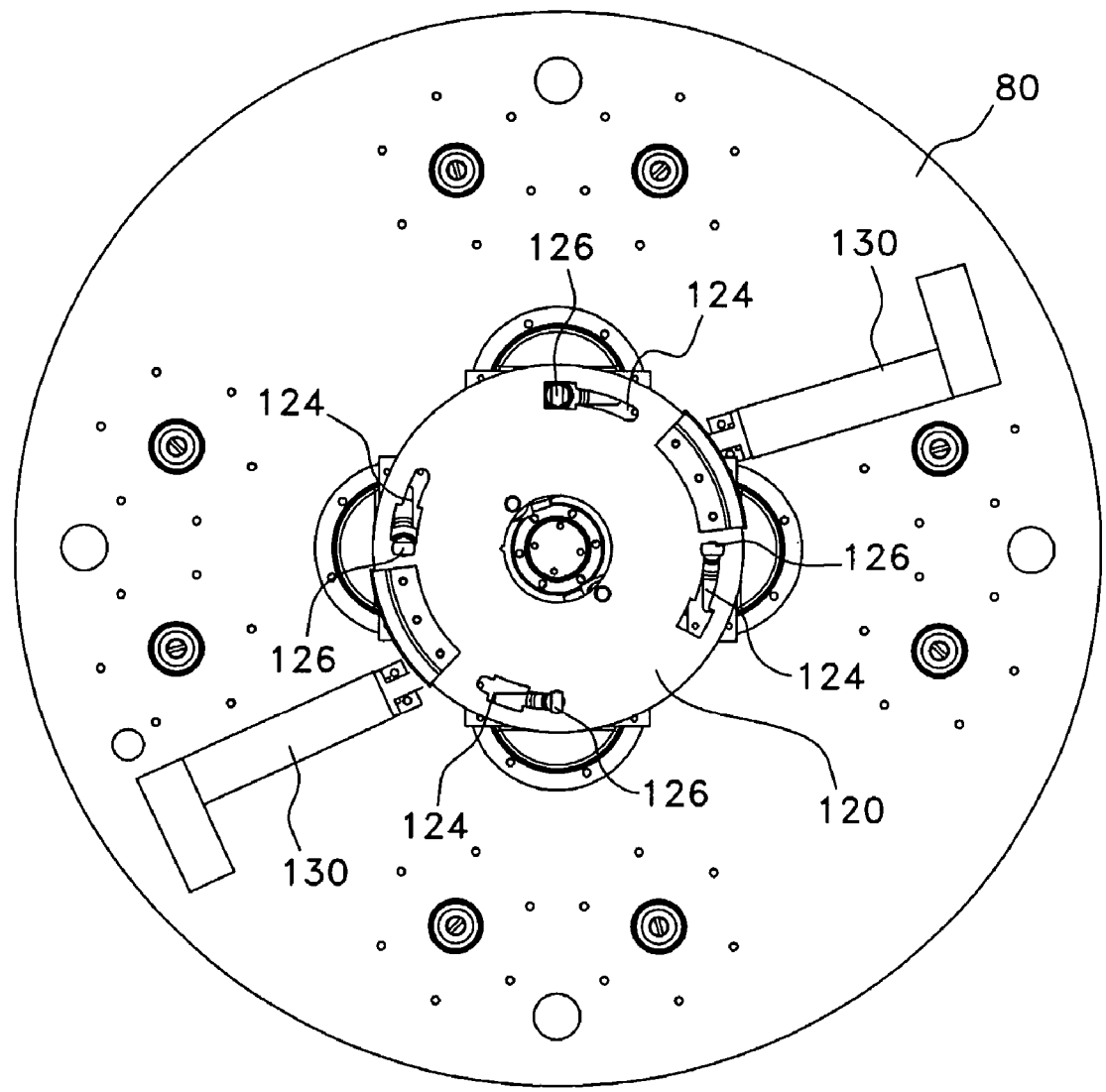
FIG. 31 is a front view of elements shown in FIG. 26.
Figure 32:
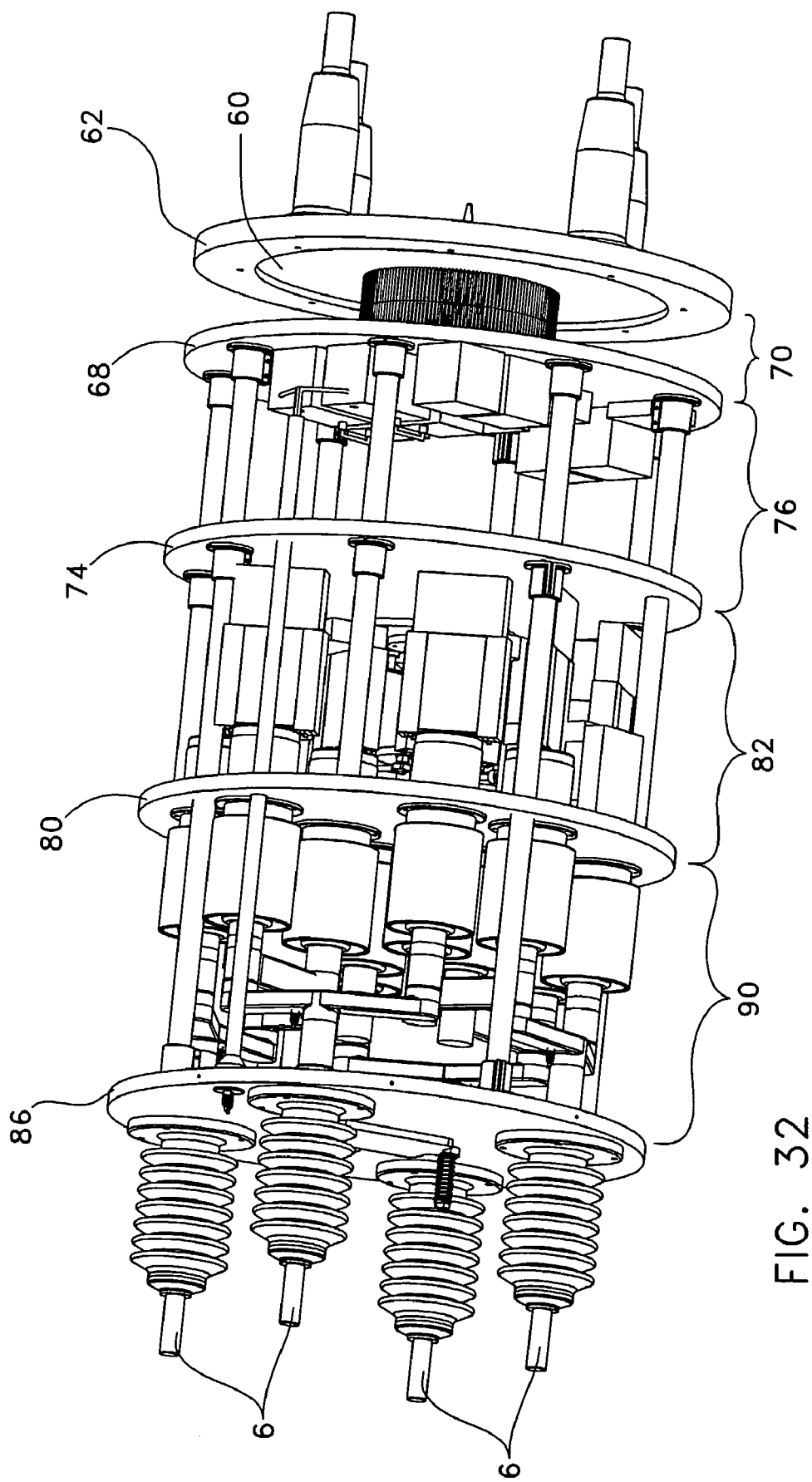
FIG. 32 is a side perspective view of another preferred embodiment of the present invention.
Figure 33:
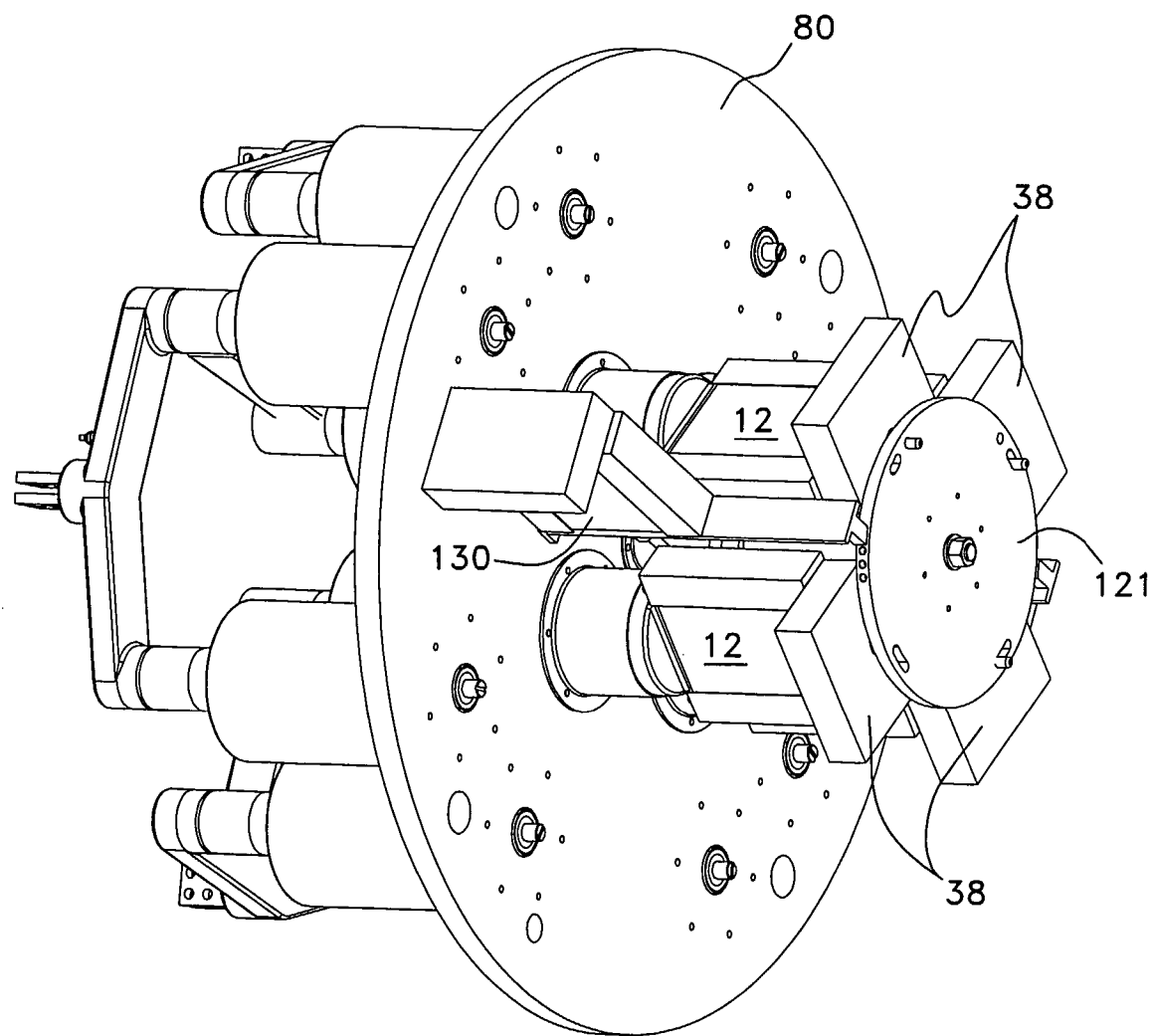
FIG. 33 is a side perspective view of elements shown in FIG. 32.
Figure 35:
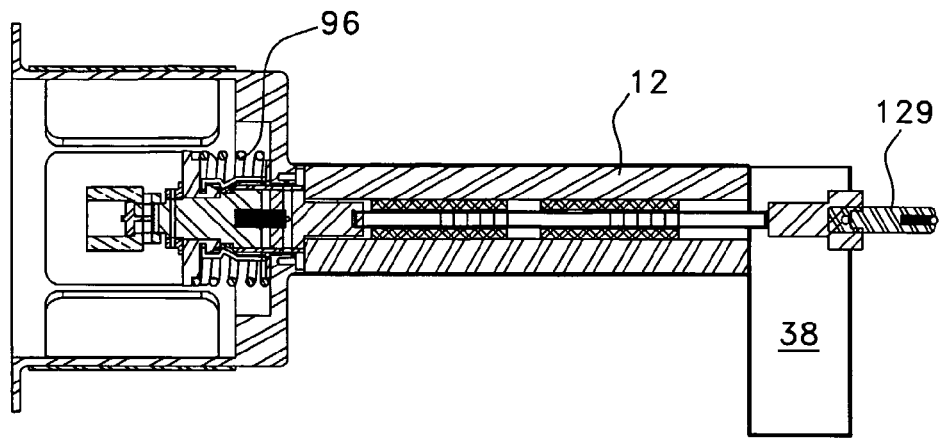
FIG. 35 is a cross-section view along section A-A of FIG. 34.
Figure 34:
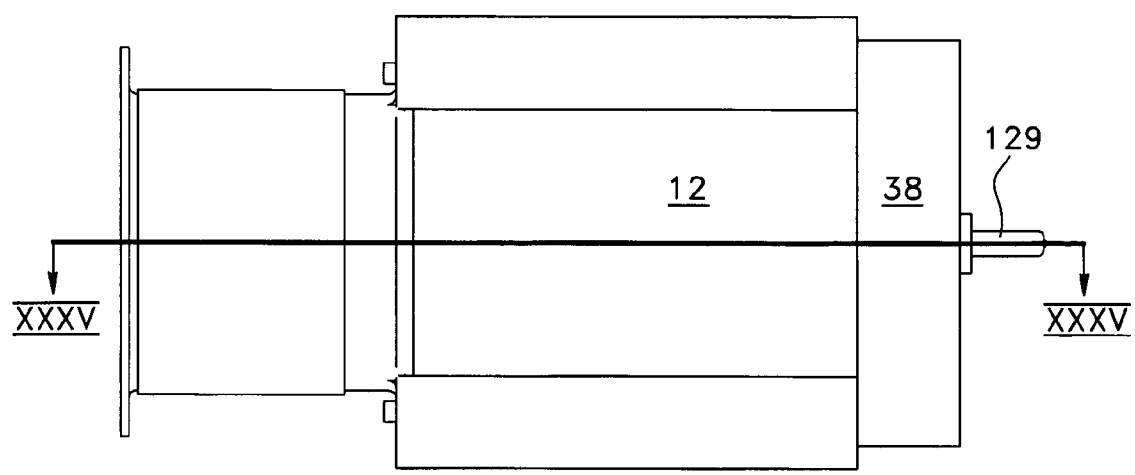
FIG. 34 is a side view of elements shown in FIG. 32.

The present invention relates to a line impedance modulator (LIM) which is a distributed flexible AC transmission system (FACTS) where each of the segments has a length of several tens of kilometers and is independent. According to the present invention, each segment of the electrical power line is provided with a switching module characterized in that it comprises at least one vacuum interrupter connected in series with at least one of the conductors of the segment. According to a preferred embodiment, such as shown in FIG. 7, at least one of the conductors is not provided with a switch which means that such conductor always provides a galvanic link. According to other preferred embodiments where switches are provided on all of the conductors, such as shown for example in FIG. 24, a "make before break" mechanism is provided so that the four conductors of a segment of the phase line are never opened simultaneously.

Figure 5:
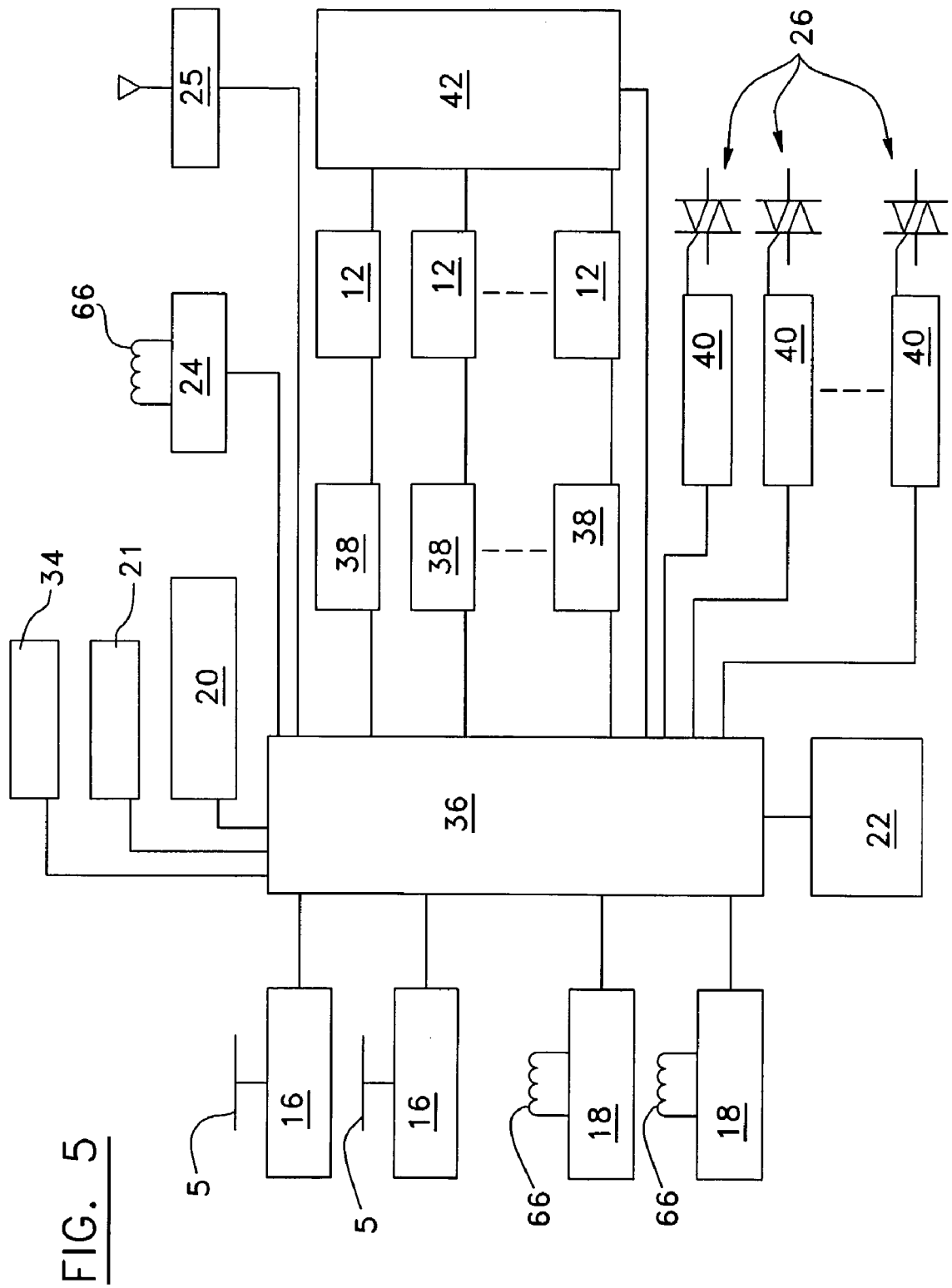
FIG. 5 is a block diagram of an apparatus according to a preferred embodiment of the present invention in relation to FIG. 2.
Figure 17:
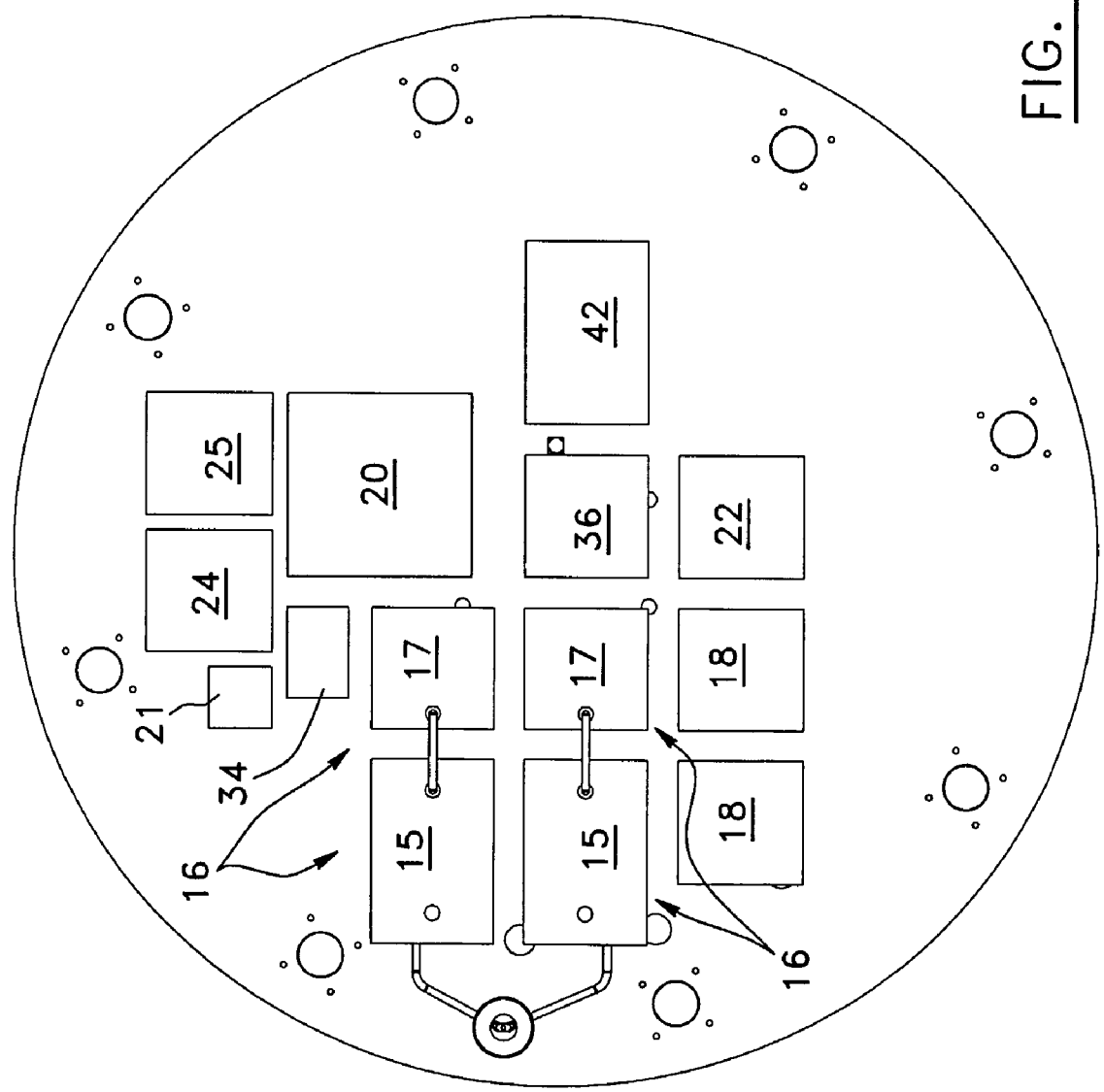
FIG. 17 is a schematic front view of the apparatus shown in FIGS. 7 and 8.
Figure 42:
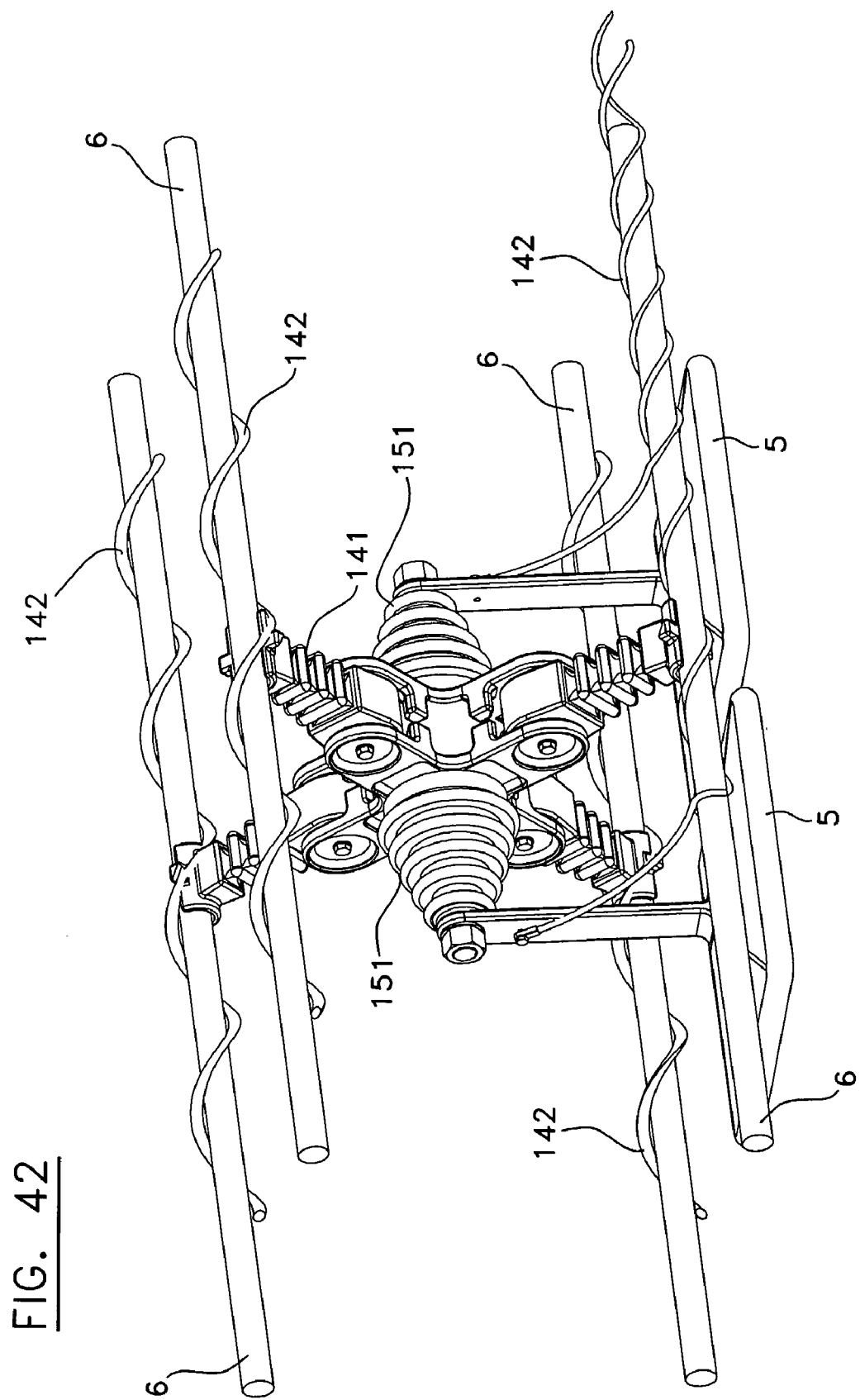
FIG. 42 is a side perspective view of the antennae of a capacitive contactless power supply, mounted on the conductors of a phase line, according to the present invention.

According to preferred embodiments of the present invention, redundancy is provided on several levels for safety purposes. For example, according to preferred embodiments, pairs of vacuum interrupters such as shown in FIGS. 9 to 14, connected in parallel are provided. Still according to preferred embodiments, linear actuators such as shown in FIGS. 9 to 14, are provided for forcing the closing or the opening of a given vacuum interrupter in case of a malfunction. Still according to a preferred embodiment, as shown in FIGS. 5 and 17, communications are provided by means of power line communication, wireless communication or even communication by optical fiber. A remote control of the apparatus can be performed via the communication system. Still according to preferred embodiments, as shown in FIGS. 7, 17 and 42, power supply is provided from the electrical power line by means of a contactless power supply operating either with magnetic coupling or capacitive coupling.

Still according to preferred embodiments, data representative of the current and past operations of the power line can be provided for analysis. Still according to a preferred embodiment, there is provided a black box containing a memory storing data representative of current and past operations of the apparatus, as shown in FIG. 5.

Still according to a preferred embodiment of the present invention, means are provided for closing all of the conductors of the line phases of the electrical power line in case of a malfunction of the communication system and thereby reestablishing the phase line. Still according to a preferred embodiment of the present invention, data representative of the current operations of each phase line of the segment can be sent through a communication system for remote diagnostic and maintenance.

According to a preferred embodiment, in case of loss of communication with one or multiple switching apparatus, the vacuum interrupters in one or several apparatus close themselves in a pre-established sequence causing the power line to return to its initial state within a few tens of milliseconds, which means that the power line recovers its full carrying capability. Furthermore, in case of loss of power supply in one of the switching apparatus, the vacuum interrupters close themselves in a pre-established sequence and the line is returned to its initial state within a few tens of milliseconds which means the segment of the electrical power line recovers its full capability.

Some potential applications of the present invention include the following: line impedance modulator (LIM); line deicer; on-line power supply; current limiter; sub-synchronism resonance damping; interarea oscillations damping; and breaking resistor. Passive components can be added to the apparatus according to the present invention according to the teaching of PCT application published under International Publication no 02/41459, published on May 23, 2002.

We will now refer to FIGS. 1 and 5. The components shown in FIG. 5 are specifically adapted to the embodiment of FIG. 2 but they can be easily adapted to the embodiment of FIG. 1 and even to embodiments of FIGS. 3 and 4 by a person skilled in the art. There is provided a switching apparatus for varying an impedance of a phase line of a segment 2 of an electrical power line 4. The phase line including four conductors 6 electrically insulated from each other and short-circuited together at two ends of the segment by means of short circuits 8. The phase line shows four conductors but there can be n conductors 6. R, L, M are respectively representative of the resistance, the inductance and the mutual inductance of the segment 2 of the phase line A, B, or C. The segment 2 has three phase lines A, B and C.

At the minimum, the apparatus comprises at least one vacuum interrupter connected in series with at least one of the conductors 6. In the present case, there are provided three first vacuum interrupters 10 associated respectively to three conductors of the phase line, three first controllable motors 12 for selectively opening and closing the three first vacuum interrupters 10, three second vacuum interrupters 14 connected in parallel respectively with the first vacuum interrupters 10, and three second controllable motors 12 for selectively opening and closing the second vacuum interrupters 14. The apparatus also comprises a detector for detecting a parameter representative of current operating conditions of the phase line. In the present case, contactless capacitive and inductive power supplies 16 and 18 are provided. The apparatus also comprises a controller 20 for controlling the first and second controllable motors 12 according to parameters detected by detectors and requests from remote control. A main contactless power supply is provided for supplying an electricity supply from the phase line. The main contactless power supply comprises the capacitive and inductive power supplies 16 and 18.

Converters are provided for converting the electricity supply from the phase line into DC and AC supplies. The DC supply feeds a capacitor box 22 for storing the DC energy.

Each of the power supplies 16 and 18 is doubled to provide a redundancy. Each inductive power supply 18 comprises current transformers 66 located in a compartment of the apparatus as shown for example in FIG. 7. These transformers have their primary supplied by the phase current. The secondary of the transformers supplies a converter which is connected to stocking capacitors located in the capacitor box 22 via the distribution box 36.

Each capacitive power supply 16 comprises an insulated conducting plate called capacitive antenna 5, shown for example in FIG. 42, located a few centimeters from the conductors of the phase line. The antennae 5 are electrically connected to transformers 15 shown in FIG. 17 and located within the switching apparatus by means of an insulator feedthrough 97 shown for example in FIG. 22. The transformers 15 supply converters 17 shown in FIG. 17, connected to the capacitor box 22 via the distribution box 36.

These capacitive and inductive power supplies 16 and 18 are connected to the distribution box 36 which distributes the electrical energy to different elements of the apparatus. This distribution box 36 is controlled by the controller 20 of the switching apparatus.

A power line communication system 24 of the PLC type (power line carrier) is connected to the controller 20 for communication through the phase line, and a high frequency emitter/receiver router 25 is connected to the PLC and to the controller 20 for wireless communication. A global positioning system 21 is also provided for locating the switching apparatus via satellite and for timing purposes. The router 25 and global positioning system 21 have antennae 57 as shown for example in FIG. 24.

All of the switching apparatus of a power line can be linked to a local telecommunication network. In this local network, the switching apparatus of each phase line communicates: 1) between the different segments of the power line through PLC; 2) between switching apparatus of a segment through a short-range RF or infrared link; and 3) to the substation repeater at both ends of the electrical power line or in between, through a short-range RF, infrared link or fiber optic link.

Figure 2:
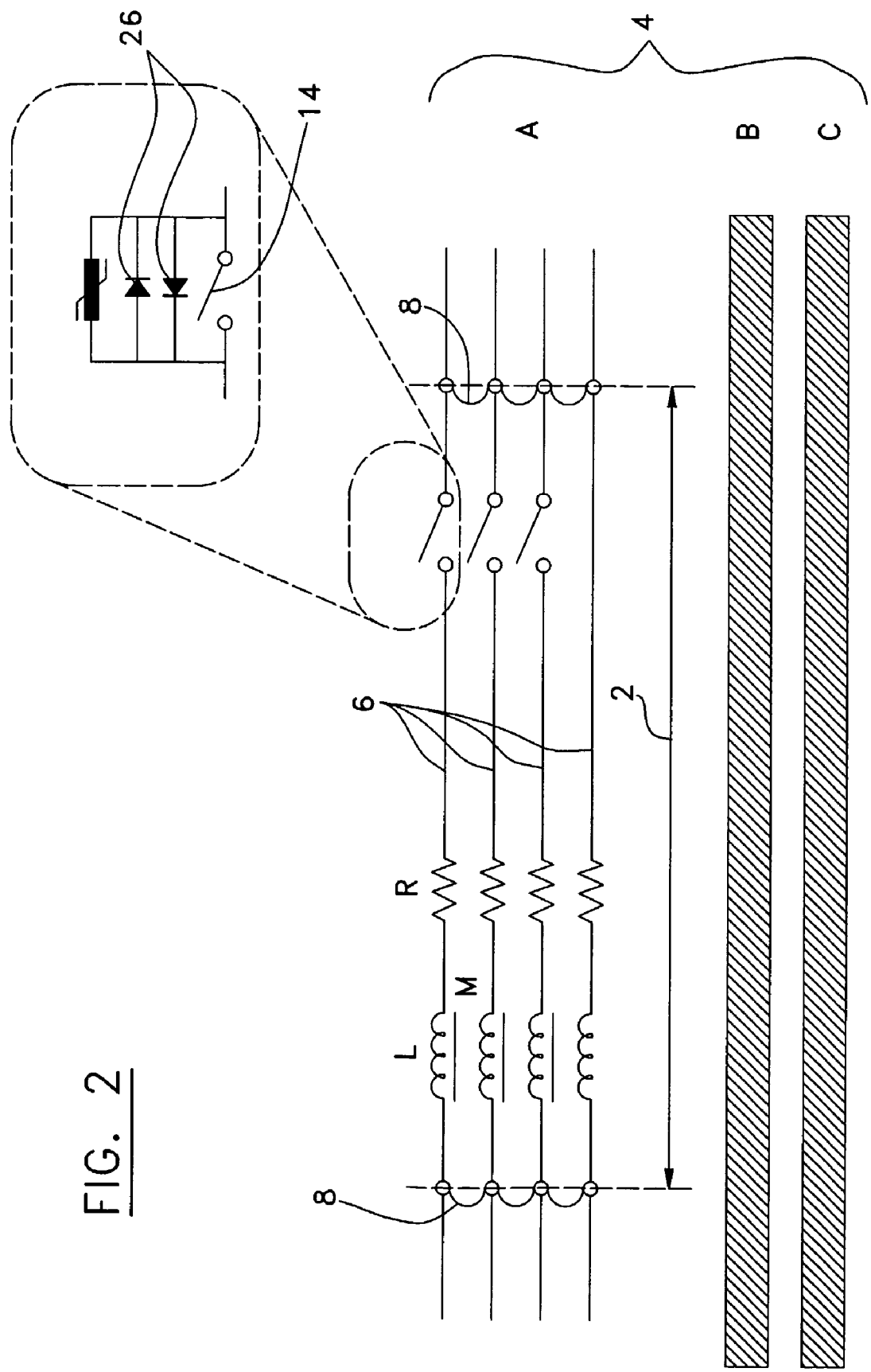
FIG. 2 is a schematic view of a segment of an electrical power line, provided with an apparatus according to another preferred embodiment of the present invention.

Referring now to FIG. 2, there is shown an embodiment where the apparatus comprises three electronic switches 26 connected in parallel respectively with the three vacuum interrupters 14, the electronic switches 26 are controlled by the controller. Of course, less than three electric switches can be provided.

Figure 3:
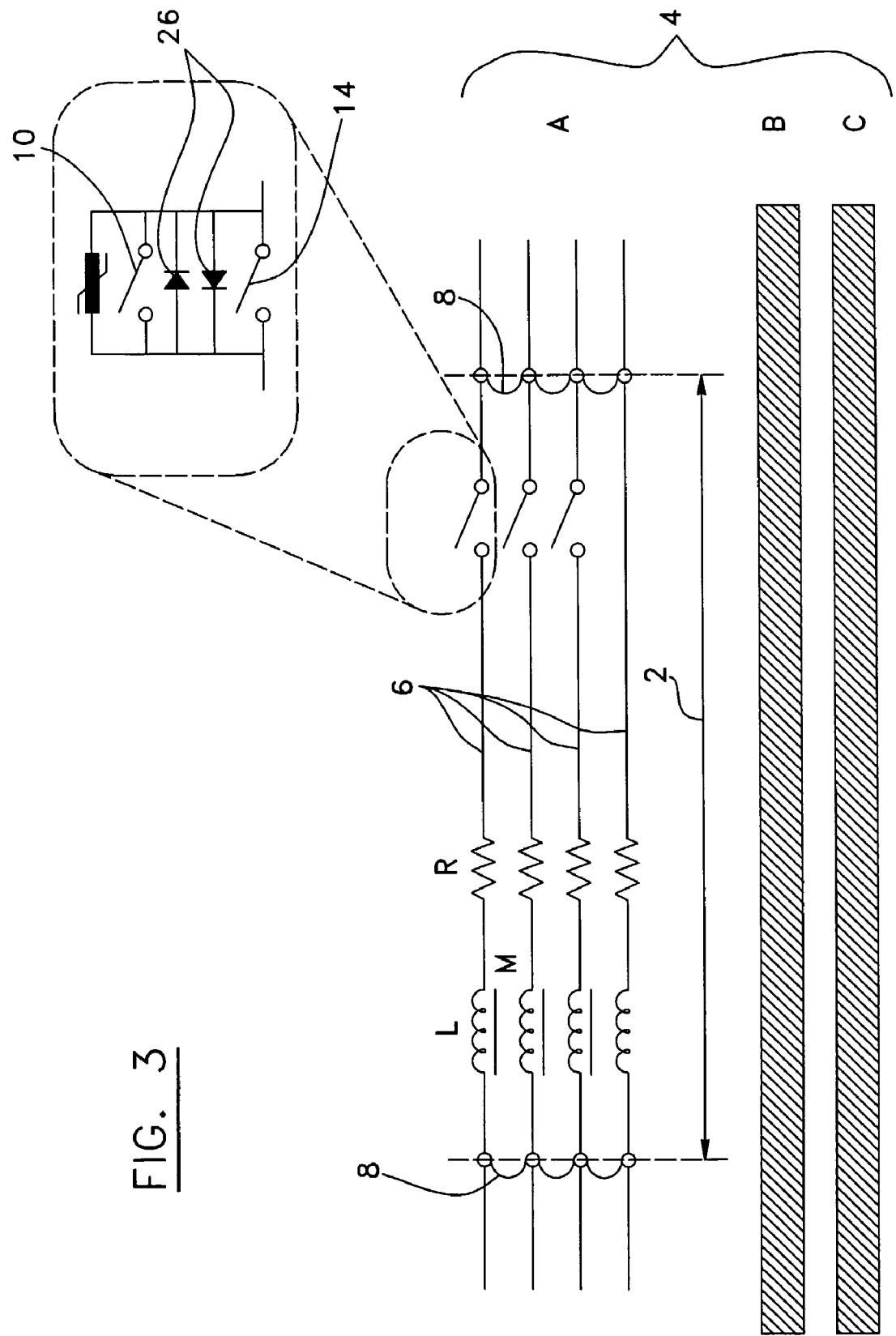
FIG. 3 is a schematic view of a segment of an electrical power line, provided with an apparatus according to another preferred embodiment of the present invention.

Referring now to FIG. 3, the apparatus, in this embodiment, comprises three electronic switches 26 connected in parallel to the first and second vacuum interrupters 10 and 14. It is also possible to provide less than three electronic switches.

Figure 4:
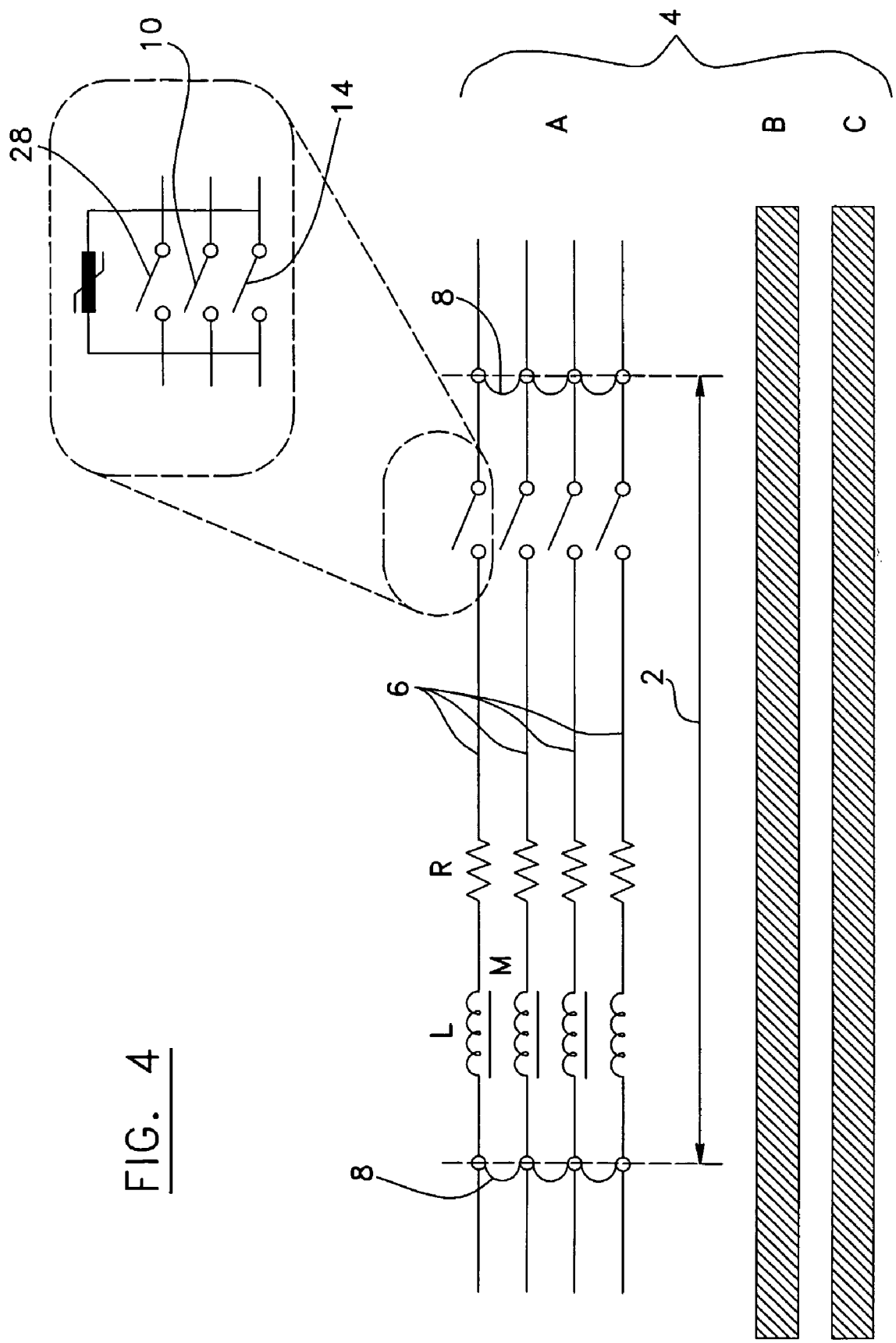
FIG. 4 is a schematic view of a segment of an electrical power line, provided with an apparatus according to another preferred embodiment of the present invention.

Referring now to FIG. 4, there is shown an apparatus according to the present invention for deicing. This apparatus comprises four first, second and third vacuum interrupters 10, 14 and 28 connected in parallel and associated respectively to four conductors of the phase line, and four first, second and third controllable motors 12 for selectively opening and closing the first, second and third vacuum interrupters 10, 14 and 28.

Referring now to FIG. 5, the apparatus comprises a black box 34 comprising a memory and a housing for protecting the memory. The memory is connected to the controller 20 for storing parameters representative of current and past activities of the switching apparatus and of the phase line. The controllable motors 12 can be single phase linear motors, polyphase linear motors, regular motors provided with a lead screw or any other kind of motors. The flow of signals and power supplies within the apparatus is done by means of a distribution box 36. Each motor 12 is connected to the distribution box via a motor converter 38. Each electronic switch 26 is connected to the distribution box via an electronic switch control card 40.

We will now refer to FIGS. 5 and 6. the motors 12 shown in the upper part of FIG. 6 are for controlling the second vacuum interrupters 14 shown for example in FIG. 1. The motors 12 shown in the lower part of the figures are for controlling the first vacuum interrupters 10 shown also, for example, in FIG. 1. As can be seen in FIG. 6, the motors for controlling the second vacuum interrupters 14 which are used as bypass jumpers are connected to a "sidekick trigger" device 42. This "sidekick trigger" device 42 comprises, for each of the second controllable motors, a dedicated contactless power supply 44 for supplying an electricity supply from the phase line, a rectifier 46 for rectifying the electricity supply, a capacitor 48 for storing electrical energy from the output of the rectifier 46 and a controllable switch 50 for discharging the capacitor 48 into the corresponding second controllable motor to close it, upon reception of a control signal from the controller 20. The controller 20 has a detector for detecting a malfunction in the high frequency emitter/receiver router 25 and the power line transmission system 24 and any other malfunctions, and a command generator for generating the control signal upon detection of the malfunction to close at least one or all of the second vacuum interrupters 14 shown for example in FIG. 1 through the motor converters 38 if there is no response through the "sidekick trigger" mechanism 42.

The controller has also a detector for detecting a malfunction in the main contactless power supplies 16 and 18, and a command generator for generating the control signal upon detection of the malfunction to close at least one or all of the second vacuum interrupters 14 shown for example in FIG. 1. Furthermore, the controller has an input for detecting a malfunction in the first vacuum interrupters shown for example in FIG. 1, and a command generator for commanding the second controllable motors to close at least one or all of the second vacuum interrupters 14 shown for example in FIG. 1 upon detection of a malfunction in one of the first vacuum interrupters.

Referring now to FIGS. 1, 3 and 4, in case of an explosion in one of the first vacuum interrupters 10, which is not likely if the system is well designed, the second vacuum interrupter 14 associated with the first vacuum interrupter that has exploded is closed and the maximum impedance modulation amplitude is reduced by epsilon. The second vacuum interrupters 14 are used as bypass jumpers. Epsilon is small and is a function of the number of segments in service in the power line which can have a length of 200 km. The higher the number of segments, the lower is epsilon. If one vacuum interrupter is subject to a malfunction, the line continues to be operable. The replacement of a partially defective switching apparatus takes less than one day and this can be done without any service interruption. With exception of an unintentional flaw in the design, the power line will not lose his carrying capability. In case of a malfunction of one of the first vacuum interrupters 10, the second vacuum interrupter 14 takes over automatically.

We will now refer to FIGS. 2, and 7 to 17, to describe a preferred embodiment of the switching apparatus. The switching apparatus generally comprises at one end a first conducting plate 60 insulated by means of an insulator 62 from the lateral wall 64 of the housing shown in FIG. 18. This first conducting plate 60 electrically connects the four conductors of the line phase. The electrical current of the four conductors flows from the first plate 60 through a central conductor which extends through current transformers 66 then through a second conducting plate 68. These two conducting plates 60 and 68 delimit a first compartment 70 that contains the transformers 66. The transformers 66 are used for measuring the phase current, for extracting electrical supply from the phase line, and as an emitting and receiving antenna for the power line communication and the global positioning system (GPS).

The electrical current flows from this second conducting plate 68 though a series of conductors 72 located in periphery of this second plate 68 to a third conducting plate 74. These second and third conducting plates 68 and 74 delimit a second compartment 76 for housing the controller and the power supplies. This configuration reduces the magnetic field produced by the phase current within this second compartment 76, and also in compartments 82 and 90.

Then, the electrical current flows from this third plate 74 through conductors 78 located in periphery of this third plate 74 to reach a fourth conducting plate 80. These third and fourth conducting plates 74 and 80 delimit a third compartment 82 that contains the actuators. Each actuator comprises a motor, a converter and associated control mechanical devices. These actuators are controllable motors for opening and closing the vacuum interrupters. This fourth conducting plate 80 is used as a voltage reference for all of the vacuum interrupters. This fourth conducting plate 80 is connected to a fifth conducting plate 86 through conductors 84 located in periphery of this fourth conducting plate 80. This fifth conducting plate 86 is the output plate of the switching apparatus. The fourth and fifth conducting plates 80 and 86 delimit a fourth compartment 90 that contains the switches which are the vacuum interrupters. This fifth conducting plate 86 contains insulator feedthroughs 65 for the passage of the conductors 6, a door 92 for dampening overpressure in case of explosion, insulator feedthrough 97, shown for example in FIG. 22, for a capacitive power supply and the snubbers 97 shown for example in FIG. 22, when required.

Figure 18:
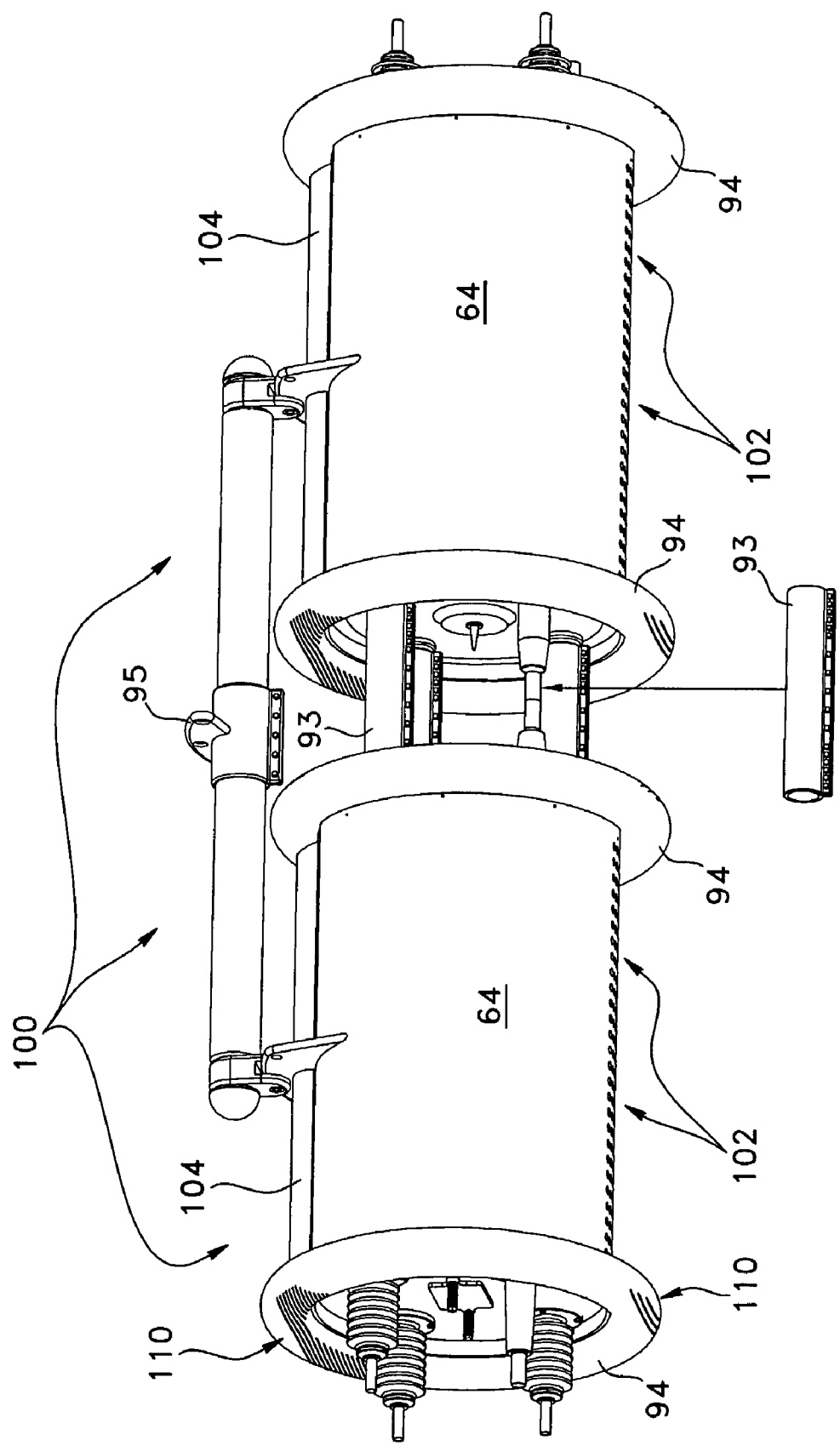
FIG. 18 is a perspective side view of another preferred embodiment according to the present invention.
Figure 19:
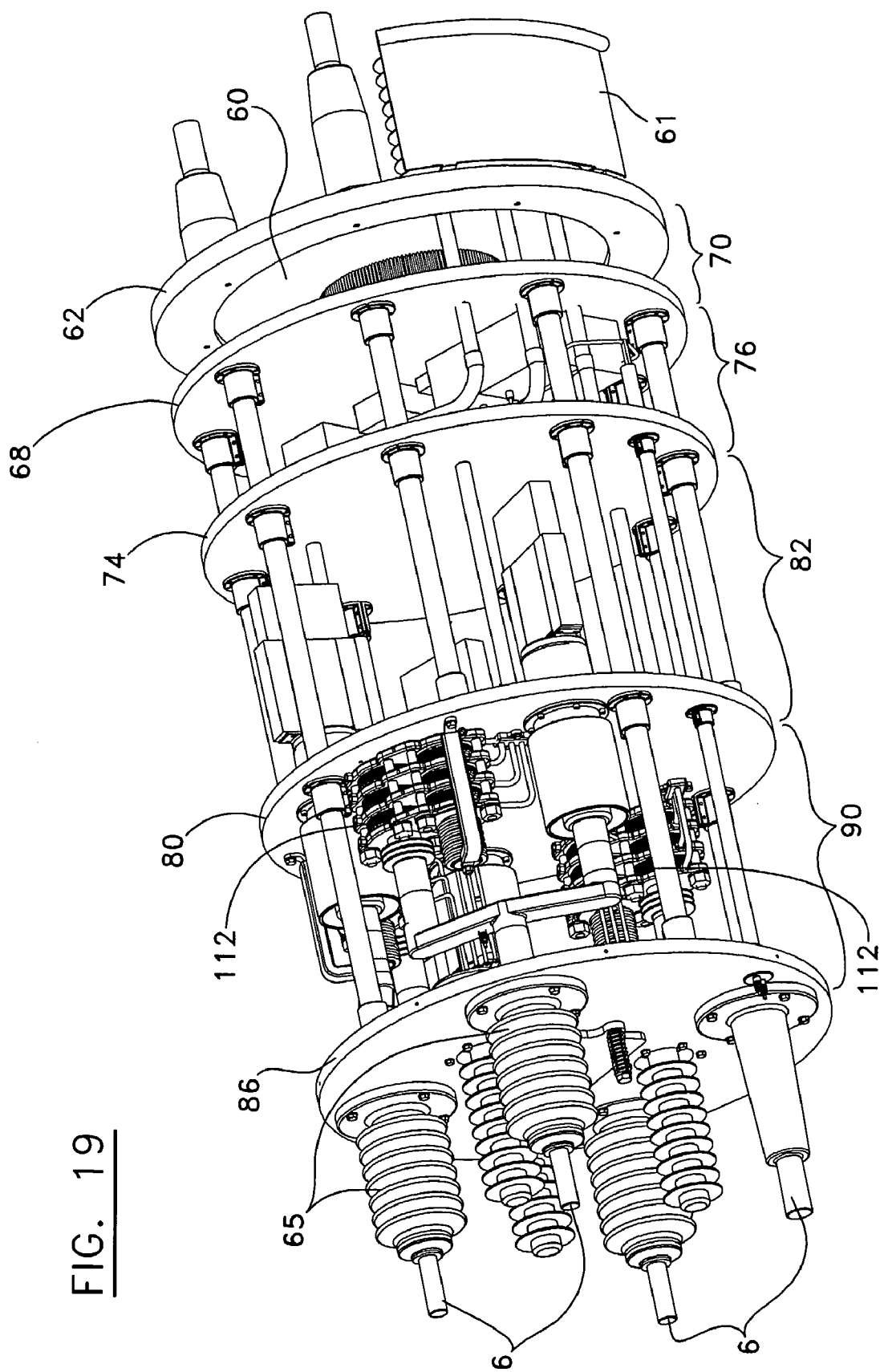
FIG. 19 is a perspective side view of another preferred embodiment of the present invention.
Figure 20:
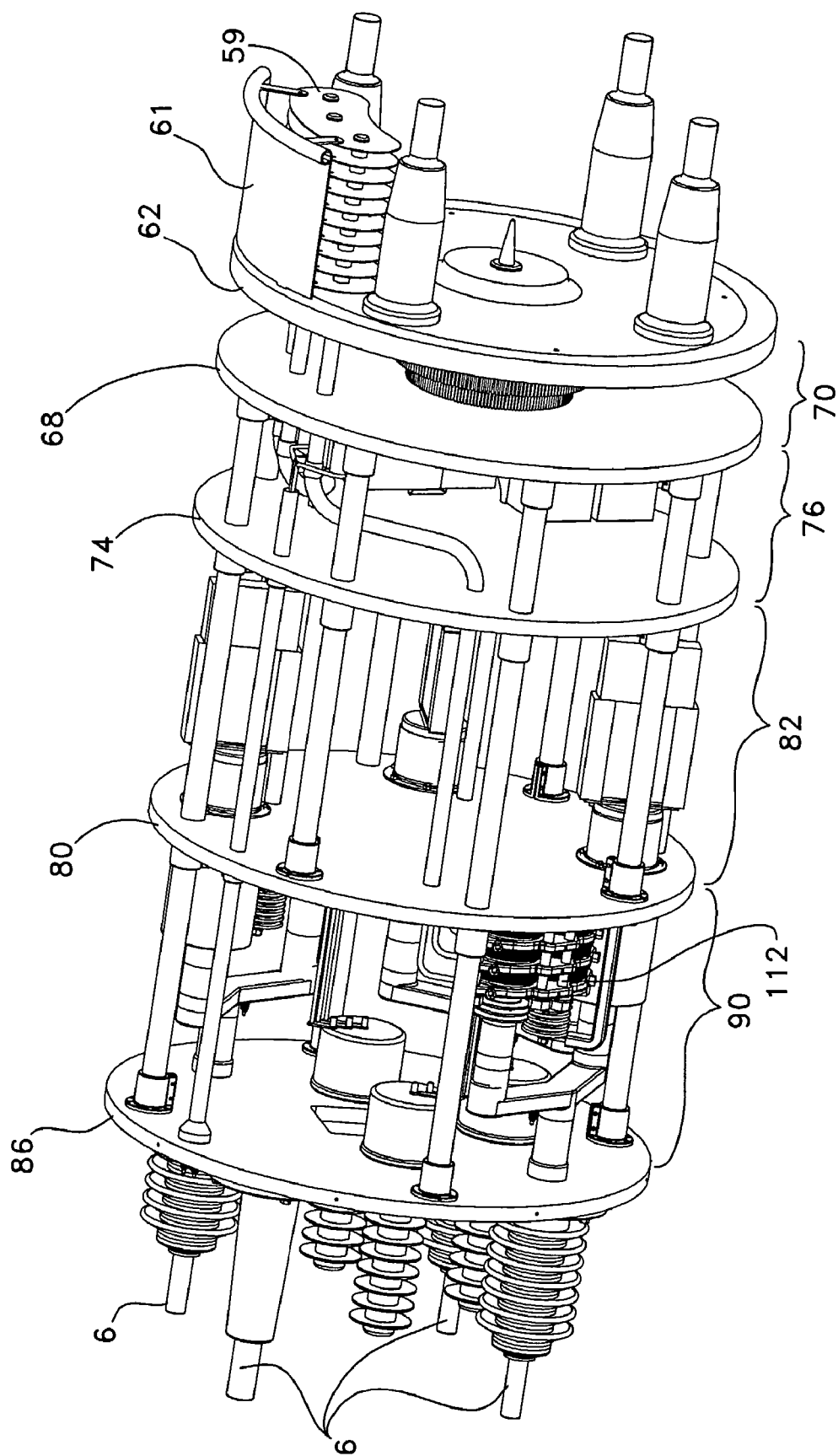
FIG. 20 is another side perspective view of the apparatus shown in FIG. 19.
Figure 21:
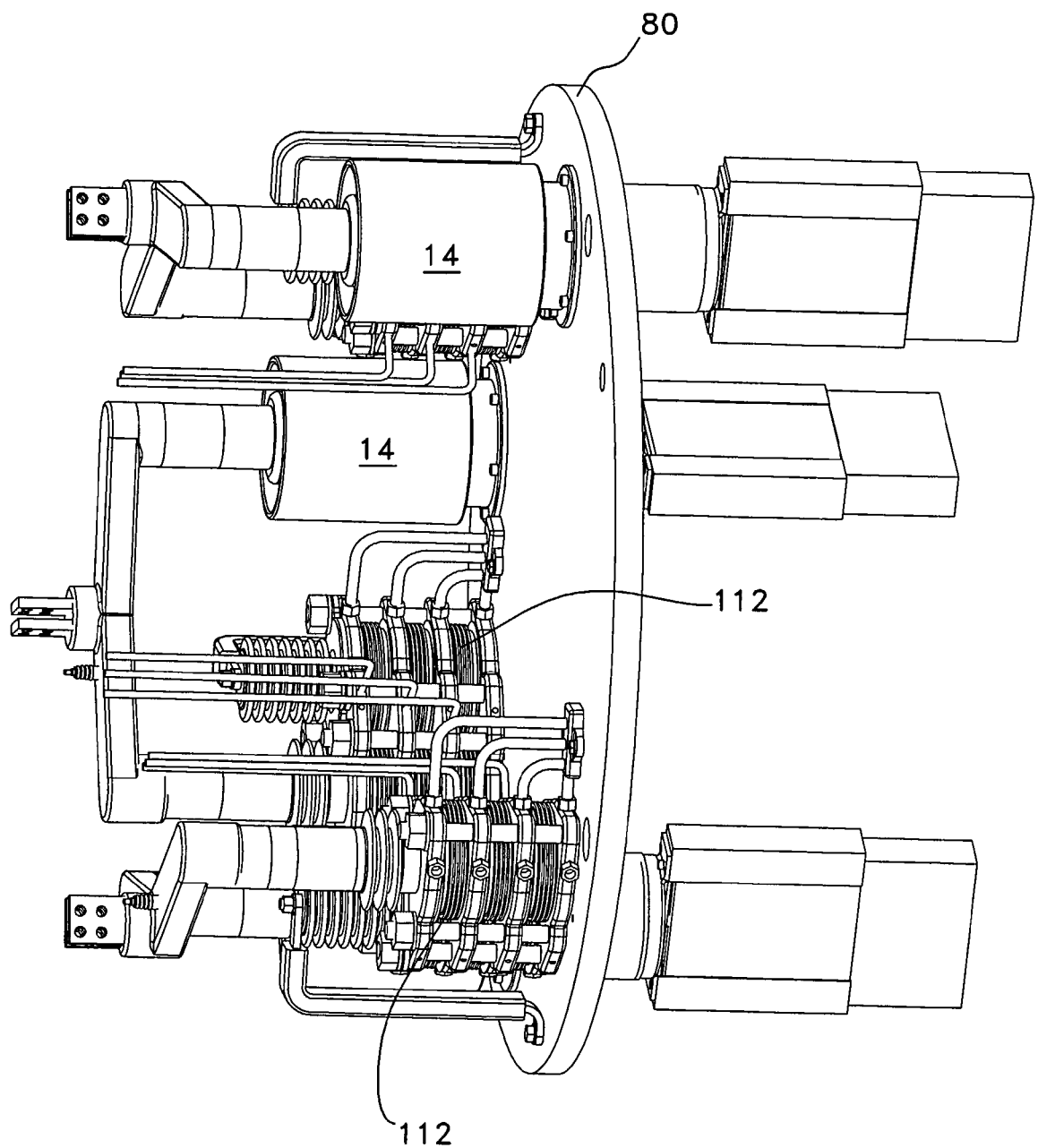
FIG. 21 is a side perspective view of elements shown in FIGS. 19 and 20.

So the switching apparatus comprises a housing having a lateral conducting wall 64 shown in FIG. 18, and first, second, third, fourth and fifth conducting plates 60, 68, 74, 80 and 86 transversal to the lateral wall and which separate the housing into first, second, third and fourth compartments 70, 76, 82 and 90. The first conducting plate 60 is provided with an insulating element 62 for electrical insulation from the lateral wall. The second, third, fourth and fifth conducting plates 68, 74, 80 and 86 are electrically connected to the lateral wall. The first, second, third and fourth conducting plates 60, 68, 74 and 80 are electrically connected to the conductors 6 and the fifth conducting plate 86 being insulated from some of the conductors 6 by means of insulator feedthroughs 65. The first and second conducting plates delimit the first compartment 70 which comprises at least one central conductor connecting the first and second plates, and transformers 66 located around the central conductor for informing the controller of the current flowing through the central conductor. The second and third plates delimit the second compartment 76 which includes the controller and the dedicated and main contactless power supplies. The third and fourth plates delimit the third compartment 82 which includes the controllable motors 12.

The fourth and fifth plates delimit the fourth compartment 90 which includes the vacuum interrupters 10 and 14. According to a preferred embodiment, a mechanical shield 13 protects the vacuum interrupters from each other.

One of the conductors 6 is directly connected to the output plate 86 of the apparatus by a galvanic link. The other conductors are connected through insulator feedthroughs 65 to enter into the fourth compartment 90 that contains the vacuum interrupters. In this embodiment, the vacuum interrupters are provided in pairs and are connected in parallel as shown more specifically in FIG. 9. The vacuum interrupters are connected to the voltage reference plate or to the housing of the apparatus. For each pair of vacuum interrupters, the second vacuum interrupter 14 is used as a bypass jumper and is connected to a "sidekick trigger" device. In FIG. 9, the shield 13 of interrupter 10 has been removed to provide a view of the elements appearing behind the shield 13. Current transformers 9 connected to the controller are also provided for measuring currents. Capacitive voltage sensors 63 are also provided for measuring voltages.

Referring now more specifically to FIGS. 11 to 14, each of the second controllable motors 12 comprises a stabilizing device 94 for stabilizing the position of the second controllable motor 12 in open or closed position. A spring 96 is provided for urging the second interrupter into a closed position. A lock is provided for holding the spring in a compressed position to keep the interrupter in open position. Either the activation of the converter 38 or the closing of the controllable switch 50 shown in FIG. 6 is sufficient to activate the motor 12 to overcome the stabilizing device 94 and open the lock 95. The spring, once the lock 95 is opened, moves the second interrupter 14 in closed position. When the linear actuator is activated for opening the second vacuum interrupter 14, the lock 95 maintains the vacuum interrupter 14 into the open position. If the converter 38 or the power supply that supplies the converter 38 is not functioning, and the controller requests the closing of interrupter 14, then the "sidekick trigger" 42 will inject current in the motor coil to overcome the stabilizing device 94 to open the lock 95 and consequently the spring 96 will close the vacuum interrupter 94.

Referring now to FIGS. 15 and 16, the first vacuum interrupter 10 connected in parallel with the second vacuum interrupter 14 is activated by a motor 12 having a bistable device 11 having two stable positions, open or closed, and a linear motor 12 as shown more specifically in FIG. 16. This first vacuum interrupter 10 is used for short-circuiting or opening the corresponding conductor.

The linear motors 12 that open and close the second vacuum interrupters 14 are made of single phase winding coil free to move within a magnetic field orthogonal to a magnetic field. A voltage source supplies the winding of the motor through a converter 38. As shown in FIG. 6, each "sidekick trigger" 42 device comprises an independent power supply for each of the linear motors 12 and its associated vacuum interrupter. These independent power supplies charge capacitors 48 which are connected to the windings of the motors through electromagnetic or electronic switches 50. When there is a malfunction of the controller, the power supply or the motor converter, then the switches 50 of the "sidekick trigger" device are forced to close. The energy accumulated by a capacitor 48 induces an electrical current through the winding of the corresponding motor 12 along a given direction to produce a movement of the corresponding linear motor. This movement overcomes the stabilizing device 94, opens the lock 95 and consequently the spring 96 closes the corresponding second vacuum interrupter 14. When all of the second vacuum interrupters 14 are closed then the phase line recovers its original capacity for flowing current. Converters 38 supply the motors 12 with the necessary energy for opening and closing the second vacuum interrupters. Also, the converters 38 and the motors 12 are used for breaking in regenerative mode or for dampening movement of any of the vacuum interrupters.

Referring now more specifically to FIG. 17, there is shown where most of the elements shown in FIG. 5 are located within the context of the embodiments shown in FIGS. 2, and 7 to 17. The contactless capacitive power supplies comprise voltage transformers 15. Capacitive supplies 17 are provided. The controller 20 is embodied by a control card.

Referring now to FIG. 18, there is shown a switching module 100 for varying impedances of two phase lines of two adjacent segments of an electrical power line. Each phase line includes four conductors electrically insulated from each other and short-circuited at two ends of its segment. The switching module comprises two switching apparatus each being for example as shown in FIG. 1 to 4. The two switching apparatus are mounted back to back. The housing is provided with openings 102 at lower and upper portions thereof for ventilation. The openings of the upper portion are not shown because they are underneath a half cylinder 104. The housing is provided with thermal insulating material to prevent overheating inside the housing from solar radiation.

The housing comprises a cylindrical wall 64 provided at its two extremities with guard rings 94. A lifting hook 95 is provided. The openings located on top are covered by the half-cylinder 104 which directs the ventilating air into the guard rings 94 which are also provided with openings 110 located underneath and on top. A thermal insulator is located underneath the cylinder to prevent overheating inside the housing from solar radiation. Mechanical couplings 93 are provided between the apparatus of the module 100.

By embodying two switching apparatus in a back-to-back switching module 100, the number of pylons that would be involved with a switching apparatus is reduced by a factor of two. For a nominal 30 km LIM or deicer segment, only one pylori per 60 km has a LIM or deicer switching module 100.

Referring now to FIGS. 2, and 19 to 21, there is shown a switching apparatus provided with electronic switches 112. When one wants to increase the opening and closing frequency, then the first vacuum interrupters shown in FIG. 1 are replaced by electronic switches 26 connected in parallel with the second vacuum interrupters 14. In this case, additional elements should be added such as a cooling system with heat pipe 59, a snubber, a circuit for protection against overvoltages, a voltage distributing circuit (not shown) for distributing the voltage among the different stages of the electronic switches, and control cards 40 shown in FIG. 5. Sun shield 61 is provided for protection against sun rays.

Figure 22:
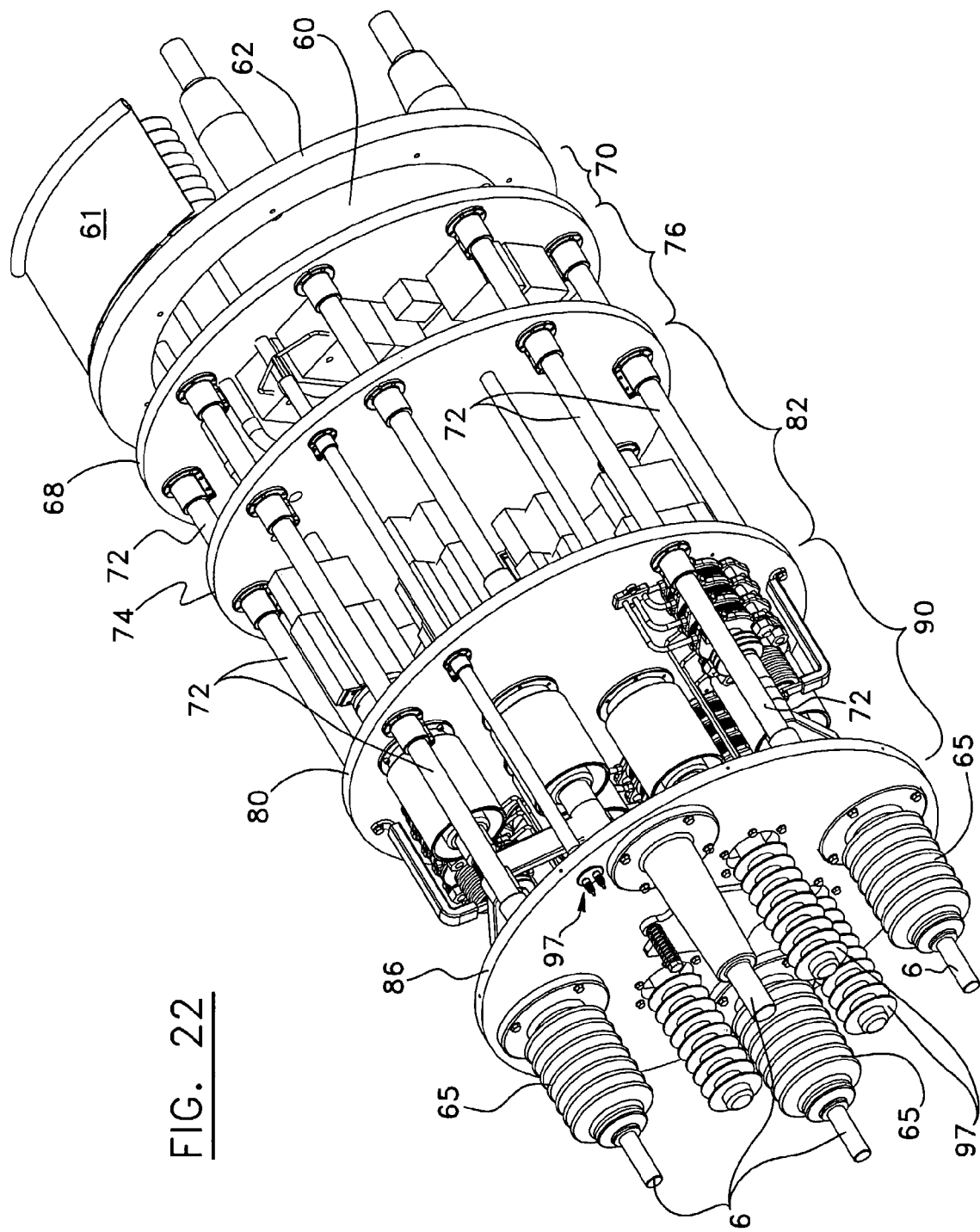
FIG. 22 is a side perspective view of another preferred embodiment of the present invention.
Figure 23:
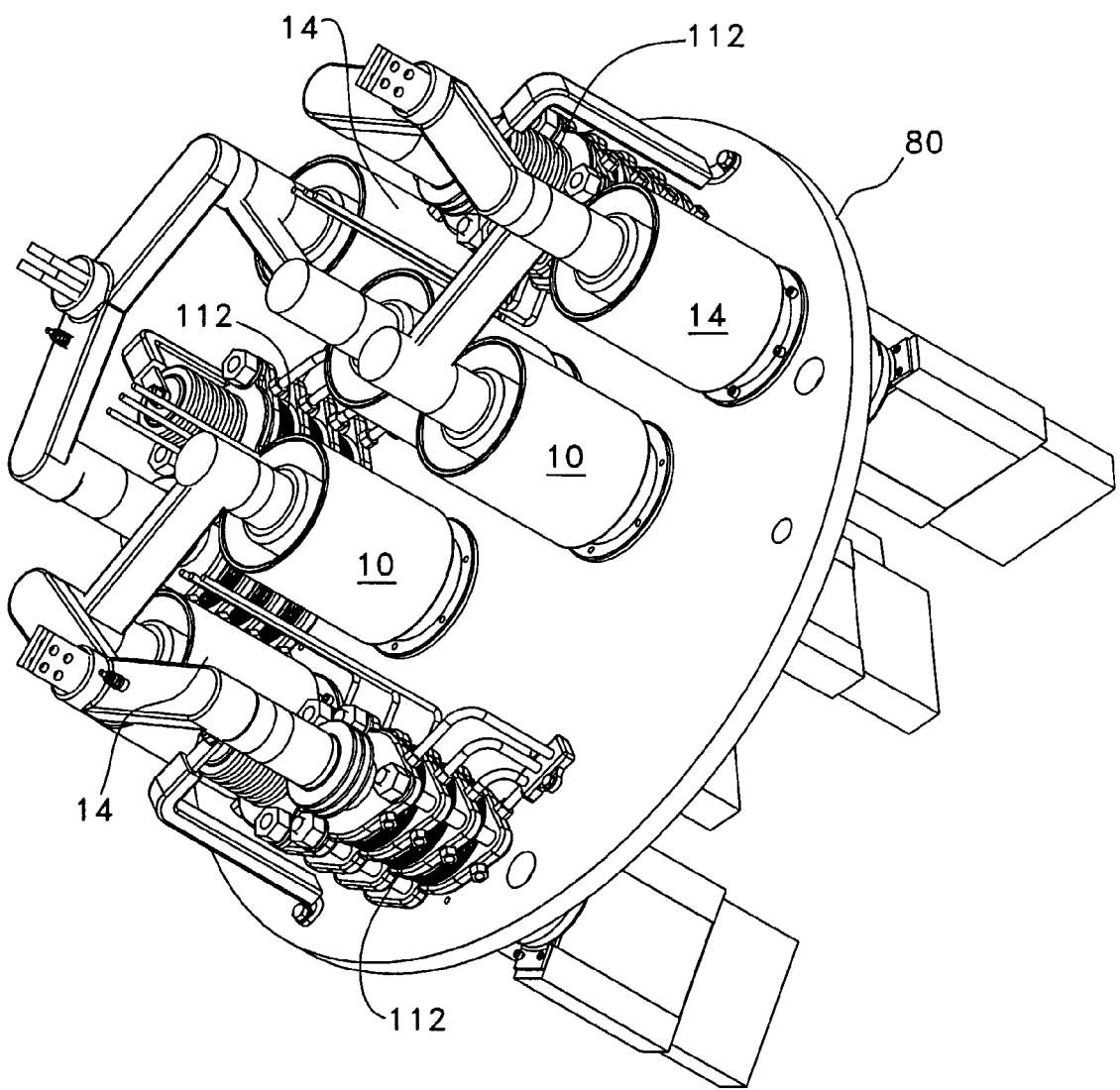
FIG. 23 is a side perspective view of elements shown in FIG. 22.

Referring now to FIGS. 3, 22 and 23, there is shown a switching apparatus with two vacuum interrupters 10 and 14 and an electronic switch 26 connected in parallel. By having the first and second vacuum interrupters 10 and 14 connected in parallel with an electronic switch 26, the operator has the choice of using either the first vacuum interrupter 10 or the electronic switch 112 for switching the corresponding conductor.

We will now describe a dejam mode which is a mode for forcing a vacuum interrupter to open. When a linear actuator is activated for opening a vacuum interrupter and this vacuum interrupter does not open because, for example, its contacts are stuck together, then an oscillating signal is superimposed to the command signal of the motor in order to superimpose a percussion force over the opening force to dejam the corresponding vacuum interrupter.

We will now describe an operating mode where additional pressure can be applied onto the contacts of the vacuum interrupters. When there is a ground malfunction, the line current can increase by several tens of kilo amperes before the time when the line circuit-breaker removes the fault, several tens of milliseconds later. During this critical period of time, it is possible to further reduce the resistance of the interrupter contacts by adding to the closing force of the springs, the force produced by the linear motors during several tens of milliseconds. According to this operating mode, the short-circuit current is detected and a strong current is applied to the windings of the linear motors by means of the converters of the motors to keep the contacts of the second vacuum interrupters closed as long as the malfunction is detected.

Referring now to FIGS. 4 and 24 to 31, there is shown an embodiment of the present invention for deicing. We will describe an operating mode that is called "make before break". In this mode, the four connectors of the phase line cannot be opened simultaneously so that the phase line is never completely opened. According to this embodiment, the apparatus comprises four vacuum interrupters 28 which are connected to a "make before break" mechanism, and four second vacuum interrupters 14 which are connected in parallel to the four first vacuum interrupters 10. The second vacuum interrupters 14 are used as bypass jumpers. By varying the operating position of the "make before break" mechanism, the vacuum interrupter 28 that is closed is switched round.

The "make before break" mechanism comprises a plate which is a lifting disc 120 activated by one or several lifting motors 122. This disc 120 is programmed and provided with openings 124 through which rods 126 pass. The rods 126 have predetermined geometries for cooperating with the shapes of the openings 124 depending on the angular position of the disc. The angular position of the disc allows to keep at any time one of the four vacuum interrupters 28 in closed position. Motors 130 rotate the disc into one of the four pre-established positions.

In short, each of the controllable motors have a rod connected to the corresponding third vacuum interrupter 28, which is movable along a course between open and close positions. A movable plate 120 is provided with four openings allowing the four rods to pass through the plate, the openings of the plate and cross sections of the rods having cooperating shapes allowing the course of a maximum of three vacuum interrupters 28 into the open position. Controllable plate motors 130 are provided for rotating the plate in different operating positions perpendicularly to the rods to determine which three interrupters 28 are allowed to move in the open position. Motors 122 are also provided for moving the plate in parallel to the rods consequently moving three of the four vacuum interrupters 28 between open and close positions thereby preventing at any time a complete opening of the phase line.

Figure 36:
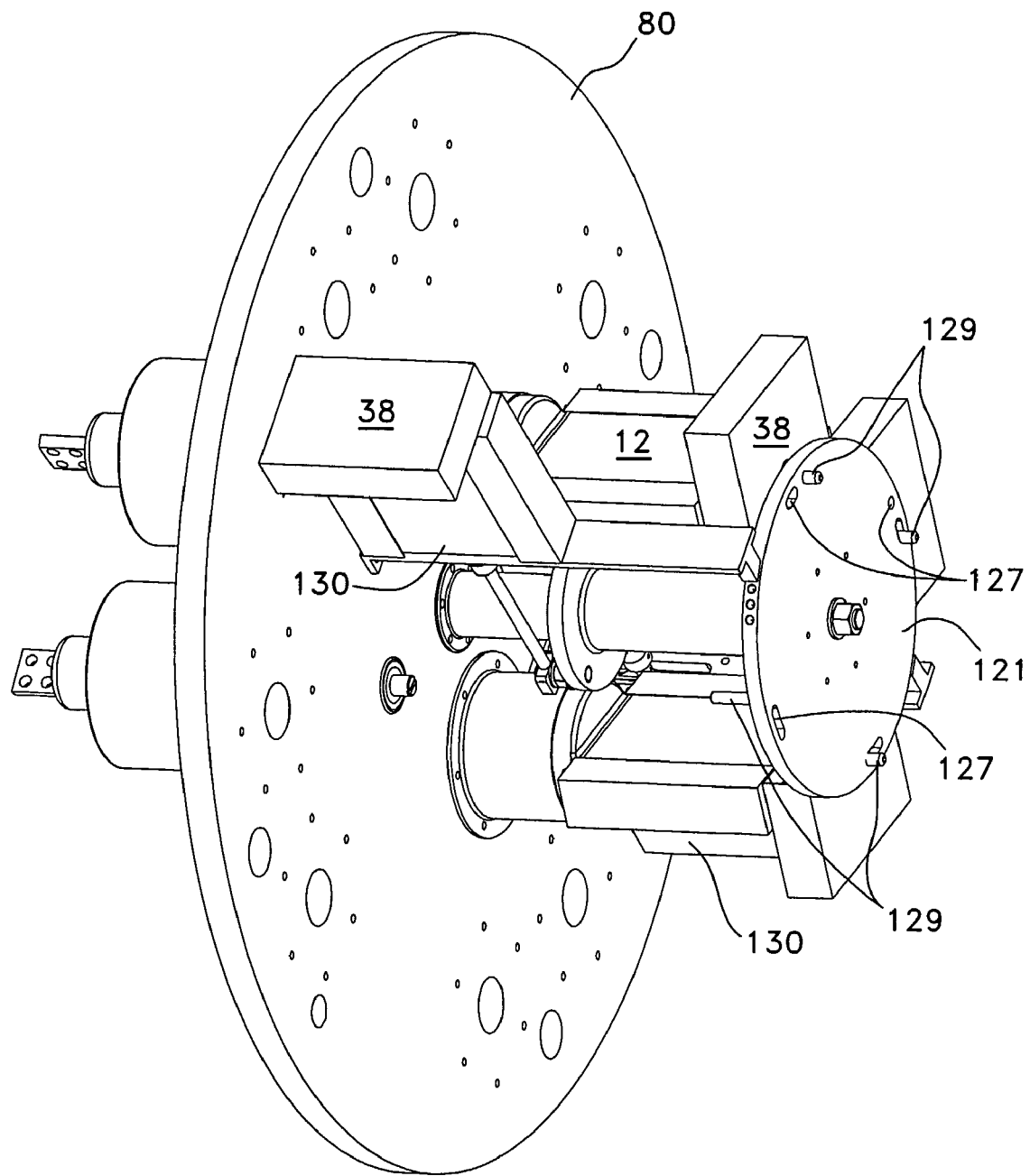
FIG. 36 is a perspective side view of elements shown in FIG. 32.
Figure 37:
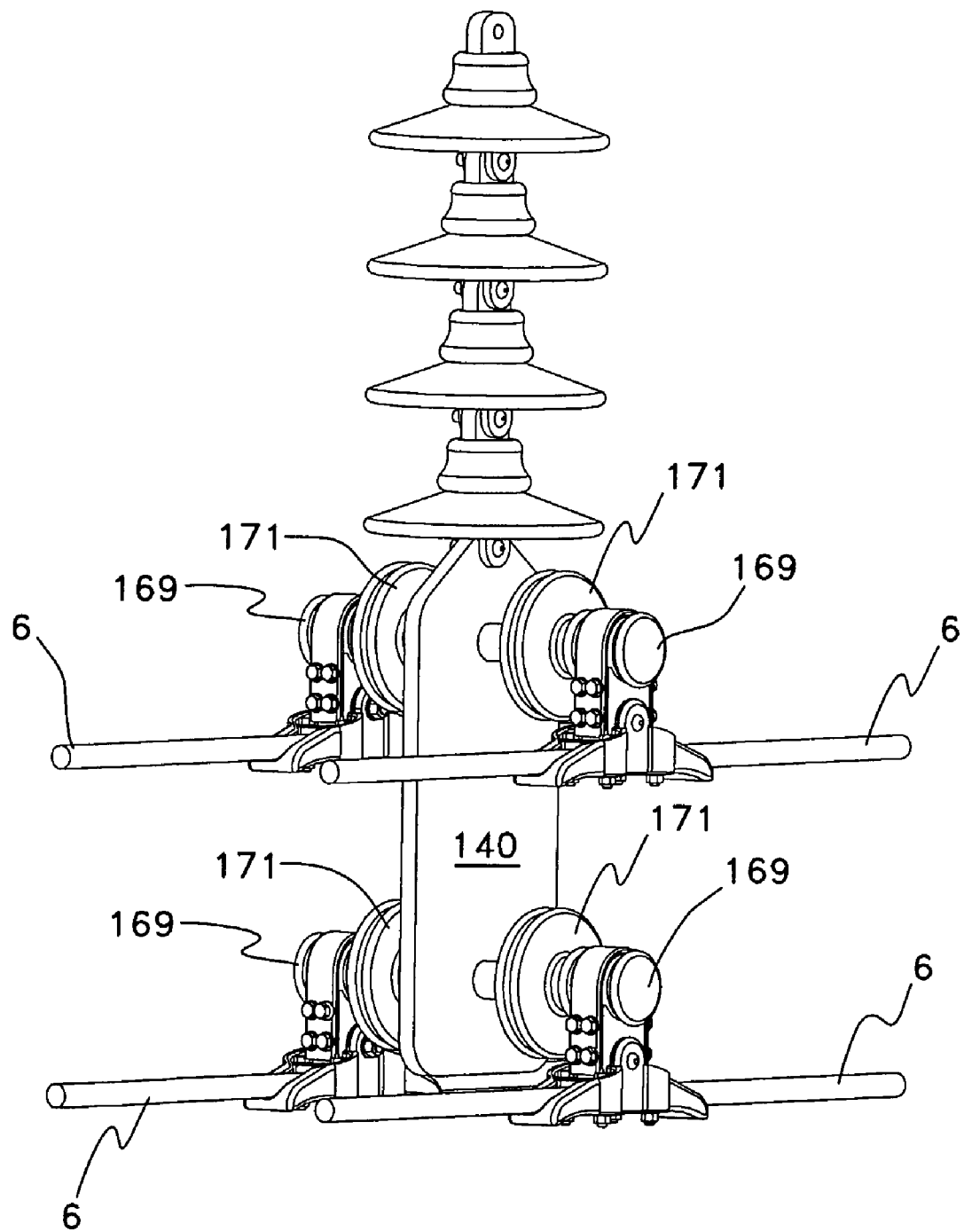
FIG. 37 is a side perspective view of a yoke plate for conductors, according to the present invention.
Figure 38:
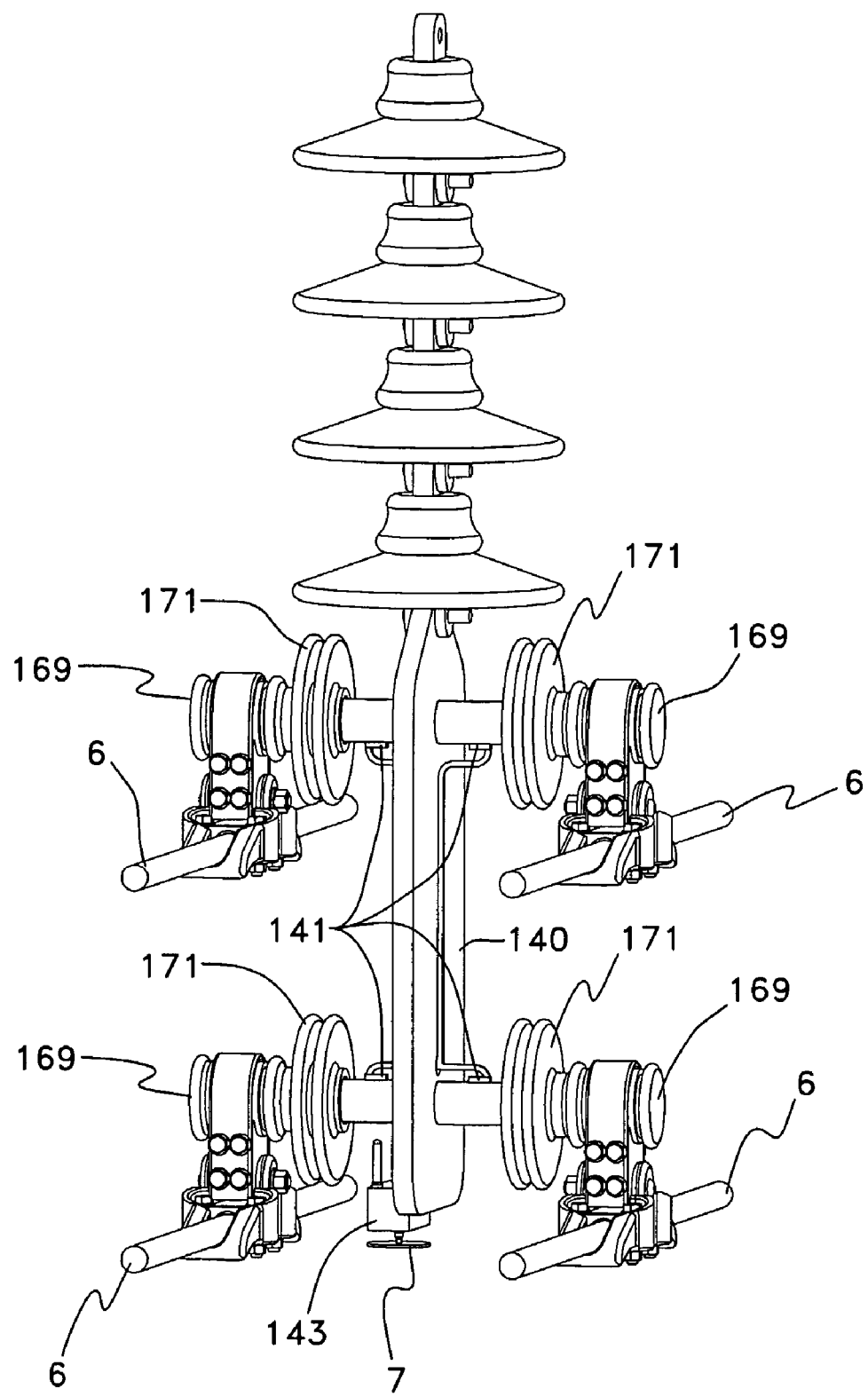
FIG. 38 is a side perspective view of another yoke plate for conductors, according to the present invention.
Figure 39:
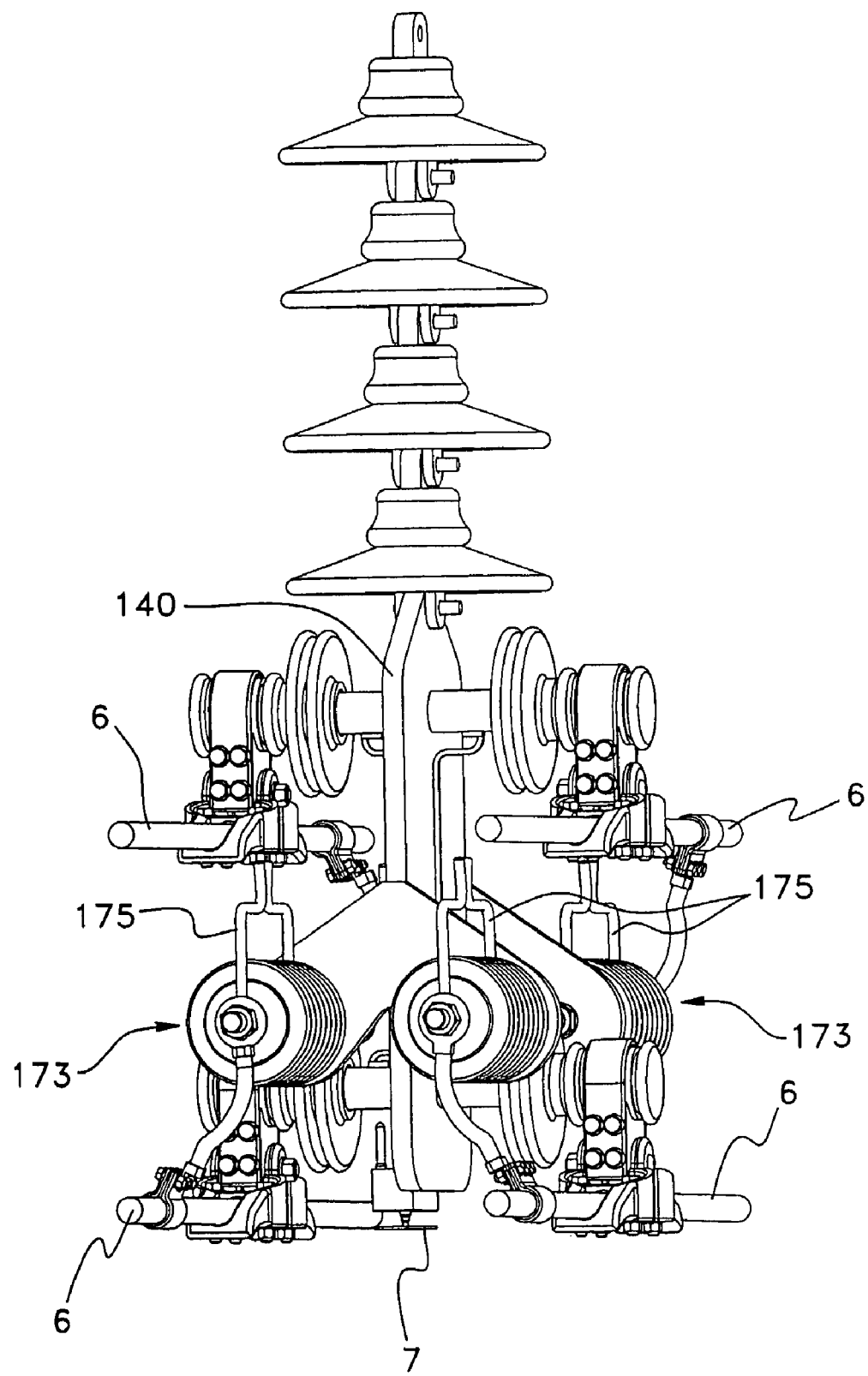
FIG. 39 is a side perspective view of another yoke plate for conductors, according to the present invention.
Figure 40:
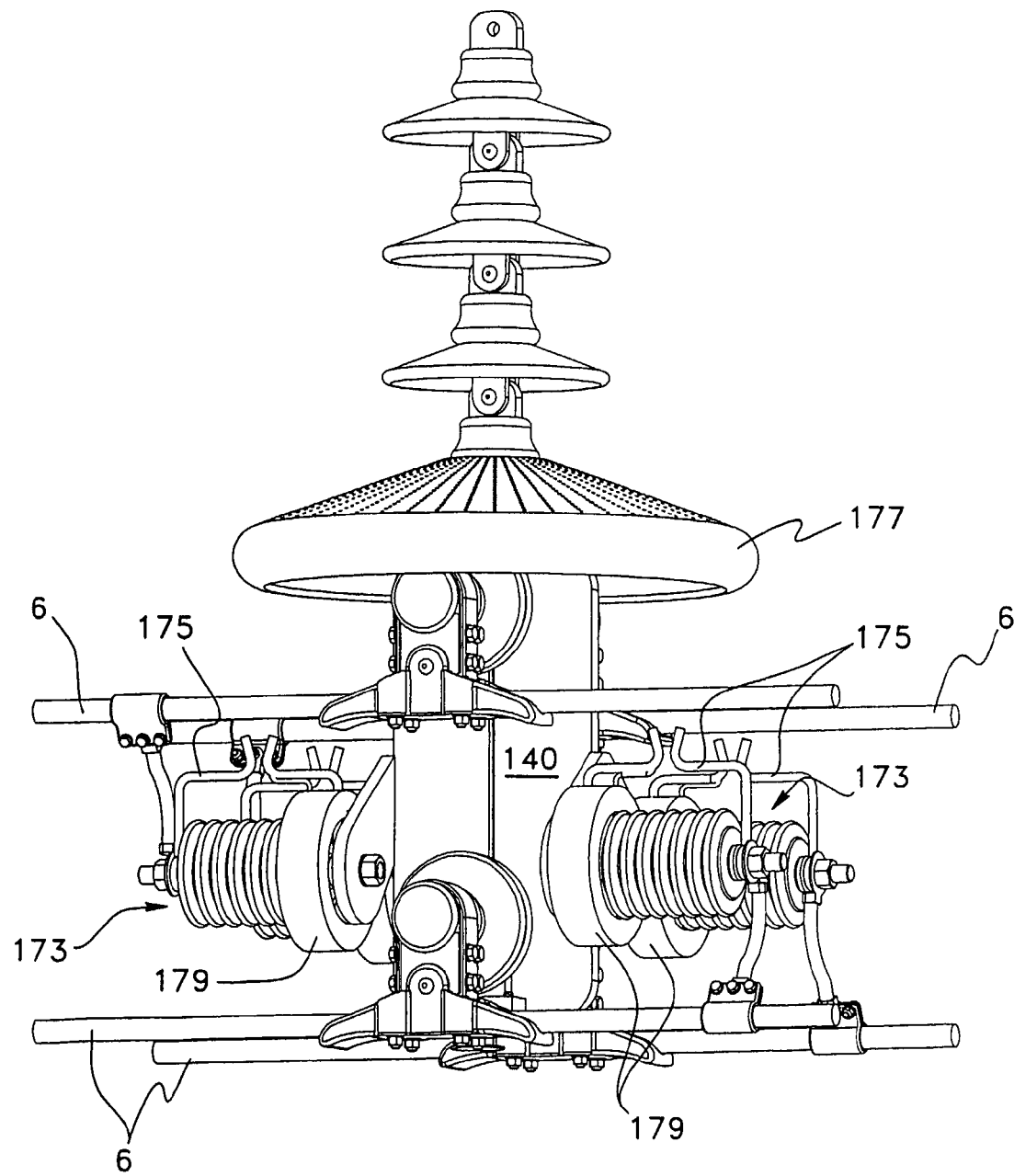
FIG. 40 is a side perspective view of another yoke plate for conductors, according to the present invention.

Referring now to FIGS. 32 to 36, there is shown another embodiment of the "make before break" mechanism, which is called "blocking mechanism". In FIG. 36, one of the motors 12 with its converter 38, spring 96 and associated elements have been removed, when compared with FIG. 33, to provide a better view of some elements such as the pin 129. In this embodiment, four linear motors are provided and are associated respectively to the four third vacuum interrupters 28 and to a blocking disc 121.

This blocking disc 121 is provided with openings 127 with different geometries, through which the pins 129 pass. The cooperation between the geometries of the openings 127 and of the pins 129 depends on the angular position of the disc 121 which prevents, at any time, a simultaneous opening of the four third vacuum interrupters 28. Motors 130 rotate the disc 121 into one of four pre-established possible positions in order to direct the current into one of the conductors of the phase line. In this embodiment, for each conductor, three vacuum interrupters are connected in parallel. The vacuum interrupters 28 are the vacuum interrupters of the "make before break" mechanism. The second vacuum interrupters 14 are used as bypass jumpers and the first vacuum interrupters 10 are used for opening and closing the conductors. The second and third vacuum interrupters are for safety purposes. For deicing a conductor, its three corresponding vacuum interrupters are closed.

In short, each of the four controllable motors has a pin connected to the corresponding third vacuum interrupter 28 which is movable along a course between open and close positions. A movable disc 121 is provided with openings 127 allowing the pins 129 to pass through the disc, the openings of the disc and the pins cooperating to allow the course of a maximum of three of the four vacuum interrupters 28 into the open position. Controllable plate motors 130 are provided for moving the disc 121 in different operating positions with respect to the pins to determine which three interrupters 28 are allowed to move in the open position consequently preventing at any time a complete opening of the phase line, the controllable plate motors 130 being controlled by the controller.

We will now describe a possible deicing procedure for the four conductors of a phase line. At the beginning, the twelve vacuum interrupters of the switching apparatus are closed. At any time, the voltage and the currents of the conductors of the phase line are measured. First, the conductor that has to be deiced is selected. Second, the disc is rotated so that the vacuum interrupter associated with the conductor that has to be deiced cannot be opened. Third, the three remaining vacuum interrupters of the "make before break" mechanism are opened. Fourth, the controller verifies that the precedent steps have been correctly performed by detecting interlocks and by measuring electrical current through the conductors. Fifth, the three vacuum interrupters used as bypass jumpers and corresponding to the three vacuum interrupters of the "make before break" mechanism that are opened are also opened according to a pre-determined sequence. Sixth, the controller verifies that the precedent steps have been performed correctly by detecting interlocks and by measuring electrical current through the conductors of the phase line. Seventh, the remaining three vacuum interrupters corresponding to those of the "make before break" mechanism that are opened are also opened according to a pre-established sequence. Eighth, the controller verifies that the precedent steps have been performed correctly by detecting interlocks and by measuring voltages and currents of the conductors of the phase line. At this point, we can consider that the deicing of one of the conductors has begun.

If a problem is detected by the controller, a report is emitted and the deicing operation is interrupted. Once the load sensors mounted on the yoke plates confirm that the deicing of the selected conductor is completed, then the steps mentioned above are performed in a reverse manner in order to close all of the vacuum interrupters. Then the steps can be performed again by selecting another of the conductors to be deiced.

In order to prevent a rotation of the conductors bundle when a deicing is performed, a deicing sequence is chosen in order to keep the center of mass of the bundle underneath the geometric center of the bundle. For example, two upper conductors and one lower conductor are deiced according to a sequence, then the two upper conductors and the other lower conductor are deiced according to a sequence. This routine is performed until all of the conductors are deiced.

Referring now to FIGS. 37 to 40, there are different yoke plates that are used to insulate the conductors of the bundle. The yoke plates 140 can be used for mounting thereon safety devices for preventing handling overvoltage from a ground or between phase fault, or problems resulting from a flash of lightning. For protecting the spacers, the yoke plates and the interrupters against overvoltage, voltage clamps such as a solid state protection 173 or spark-gaps 175 alone or in combination can be mounted. Spark-gaps activated by means of a current transformer 179 shown in FIG. 40, supplied by the current flowing through a solid state protection 173 can be used. The spark-gaps can be air spark-gaps or vacuum spark-gaps, and can be triggered, or not, by means of the current transformer. The yoke plate can also be used for measuring the ice load on each of the conductors of the phase line for the deicing purposes. The ice load information detected by load cell 141 is transmitted by means of an emitter 143 supplied in a discontinuous manner by means of a contactless capacitive power supply which is provided with a capacitive antenna 7. Insulators 171 are provided. Metallic caps 169 are mounted on the insulators 171. A booster shell guard ring 177 shown in FIG. 40 can be also provided.

When an overvoltage between the conductors of a phase line occurs because of a ground malfunction, lightning or other reasons, the protection mechanisms are self-activated. These solid state voltage limiters mounted on the yoke plates are the first to be self-activated then the spark-gaps are self-activated and finally, several milliseconds later the vacuum interrupters of the conductors are closed. When electronic switches are used, an additional voltage limiter is added near each of the electronic switches and this voltage electronic switch can be closed by means of an automatic closing system when a malfunction occurs. Finally, the vacuum interrupters used as bypass jumpers are closed several tens of milliseconds later.

Figure 41:
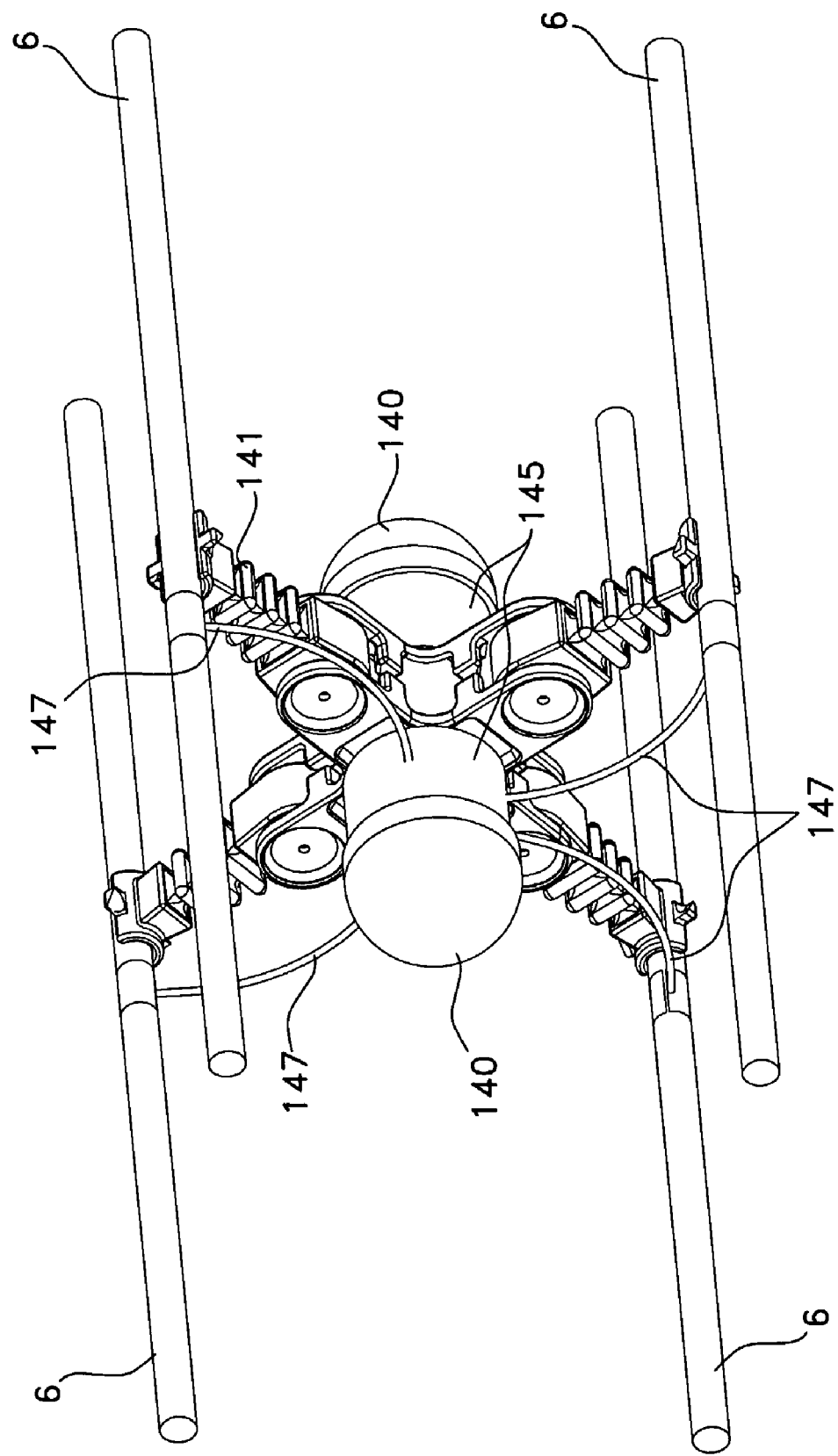
FIG. 41 is a front perspective view of an emergency light mounted on a cross-piece between four conductors of a phase line, according to the present invention.

Referring now to FIG. 41, when a segment of the electrical power line is located over a road, a speedway or a river, this segment can be provided with an emergency light 140 that is activated when the segment in question is under a deicing operation. This emergency light is mounted between the four conductors of the phase line on an insulated spacer 141. The emergency light is supplied by means of a power supply which is fed by the voltage difference that is present between the conductors by means of wires 147 when the segment of the electrical power line is under a deicing procedure. The emergency light could use solid state light emitter.

Referring now to FIG. 42, there is shown the antennae 142 of contactless capacitive power supplies of the switching apparatus. The antennae 142 are mounted on the spacer 141 by means of electric insulators 151.

Figure 43:
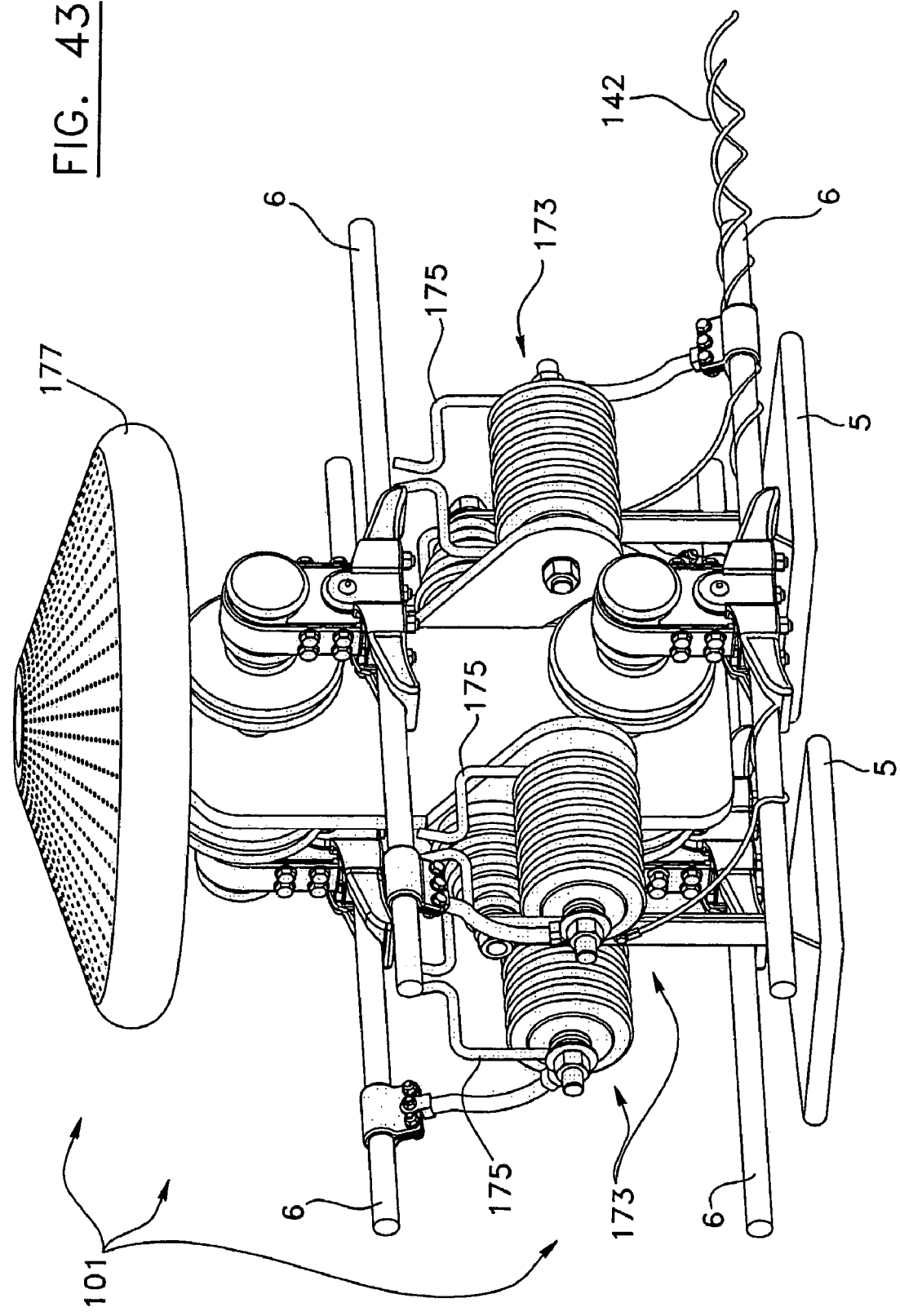
FIG. 43 is a side perspective view of an overvoltage protection circuit in combination with a contactless power supply, according to a preferred embodiment of the present invention.

Referring now to FIG. 43, there is shown an overvoltage protection circuit with a contactless power supply. The protection circuit comprises voltage clamps 173, spark-gaps 175 and a booster shell guard ring 177. The contactless power supply comprises a plate which is the capacitive antenna 5. This antenna 5 is connected to the switching apparatus via wires 142 and feedthrough 97 shown for example in FIG. 22.

Figure 44:
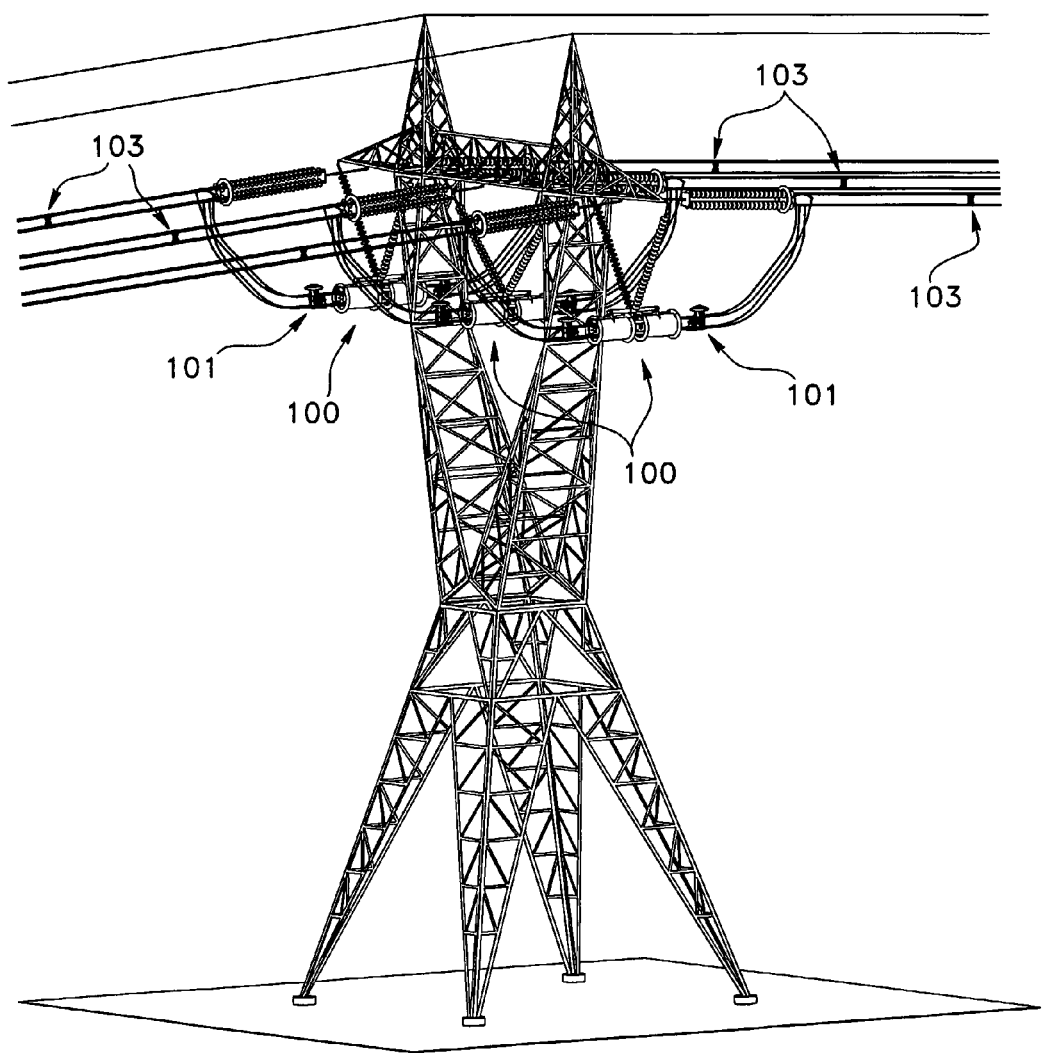
FIG. 44 is a side perspective view of a pylori onto which is mounted an apparatus according to a preferred embodiment of the present invention.
Figure 45:
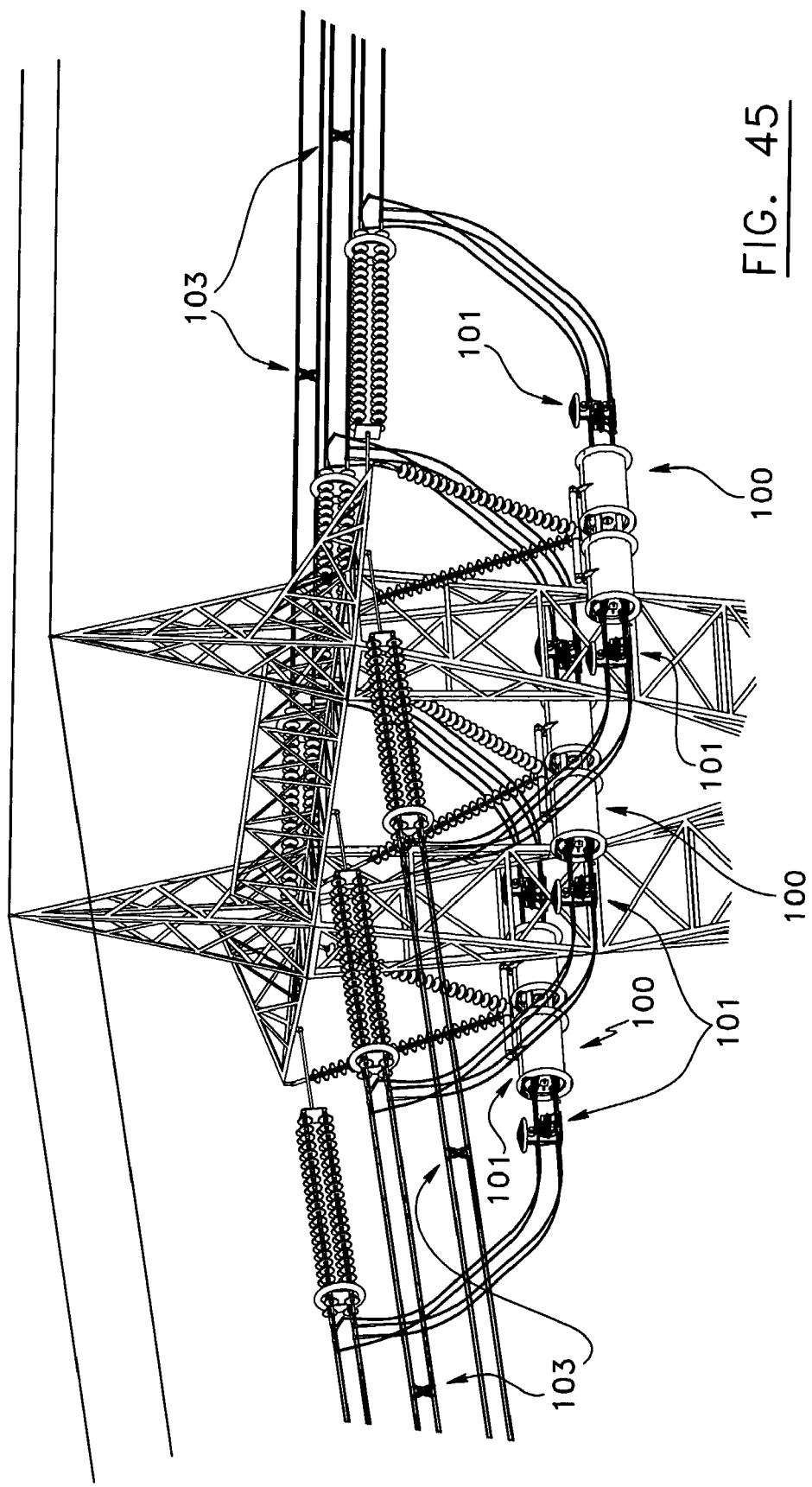
FIG. 45 is an enlarged view of the upper portion of FIG. 44.

Referring now to FIGS. 44 and 45, there is shown the switching module 100 which comprises two switching apparatus mounted back to back. These FIGS. 44 and 45 also show where the overvoltage protection circuit with contactless power supply apparatus 101 shown in FIG. 43 is mounted with respect to the module 100 and spacers 103.

Referring now to FIGS. 4, 5 and 6, we will now describe, according to a preferred embodiment, a method for varying the impedance of a phase line of a segment 2 of an electrical power line 4. The phase line includes four conductors 6 electrically insulated from each other and short-circuited together at two ends of the segment. The method comprises steps of a) providing four first vacuum interrupters 10 connected in series with the four conductors 6; b) providing four first controllable motors 12 for selectively opening and closing the first vacuum interrupters; c) detecting a parameter representative of current operating conditions of the phase line; d) controlling the first controllable motors according to the parameter detected in step c); e) providing four second vacuum interrupters 14 connected in parallel respectively with the first vacuum interrupters; and f) selectively opening and closing the second vacuum interrupters by means of second controllable motors 12, the second controllable motors 12 being controlled by the controlling of step d).

The method further comprises, for each of the second controllable motors, steps of g) providing a dedicated contactless power supply 44 for supplying an electricity supply from the phase line; h) rectifying the electricity supply by means of a rectifier 46; i) storing electrical energy from an output of the rectifier by means of a capacitor 48; and j) discharging the capacitor 148 into the corresponding second controllable motor to close said second controllable motor, upon reception of a control signal generated from the controlling of step d).

Still according to a preferred embodiment, there is provided a method wherein step c) further comprises a step of detecting whether the vacuum interrupters that should be opened in response to the controlling of step d) are opened, and emitting a warning signal when it is not the case; and the step d) of controlling further comprises a step of sending an oscillating command signal for the interrupters that are subject to a warning signal to force open the interrupters in question.

The invention claimed is:

1. A switching apparatus for varying an impedance of a phase line of a segment of an electrical power line, the apparatus comprising:
   at least one first vacuum interrupter connected in series with at least one conductor of the phase line; the phase line including n conductors electrically insulated from each other, n being equal to or greater than 2, the n conductors being short-circuited together at two ends of the segment;
   at least one first controllable motor for selectively opening and closing the at least one first vacuum interrupter;
   a detector for detecting a parameter representative of current operating conditions of the phase line; and
   a controller for controlling the at least one first controllable motor according to the parameter detected by the detector.

2. A switching apparatus according to claim 1, wherein:
   the at least one first vacuum interrupter comprises n−1 first vacuum interrupters associated respectively to n−1 conductors of the phase line; and
   the at least one first controllable motor comprises n−1 first controllable motors for selectively opening and closing the n−1 first vacuum interrupters.

3. A switching apparatus according to claim 1, wherein:
   the at least one first vacuum interrupter comprises n first vacuum interrupters associated respectively to n conductors of the phase line; and
   the at least one first controllable motor comprises n first controllable motors for selectively opening and closing the n first vacuum interrupters.

4. A switching apparatus according to claim 2, further comprising:
   at least one second vacuum interrupter connected in parallel respectively with the at least one first vacuum interrupter; and
   at least one second controllable motor for selectively opening and closing the at least one second vacuum interrupter, the at least one second controllable motor being controlled by the controller.

5. A switching apparatus according to claim 4, further comprising:
   at least one third vacuum interrupter connected in parallel respectively with the at least one first and second vacuum interrupters; and
   at least one third controllable motor for selectively opening and closing the at least one third vacuum interrupter, the at least one third controllable motor being controlled by the controller.

6. A switching apparatus according to claim 5, wherein each of the n third controllable motors has a pin connected to the corresponding third vacuum interrupter, which is movable along a course between open and close positions, and wherein said switching apparatus further comprises:
   a movable plate provided with n openings allowing the n pins to pass through the plate, the openings of the plate and the n pins cooperating to allow the course of a maximum of n−1 third vacuum interrupters into the open position; and
   a controllable plate motor for moving the plate in different operating positions with respect to the n pins to determine which of the n−1 third vacuum interrupters are allowed to move in the open position consequently preventing at any time a complete opening of the phase line, the controllable plate motor being controlled by the controller.

7. A switching apparatus according to claim 5, wherein each of the n third controllable motors have a rod connected to the corresponding third vacuum interrupter, which is movable along a course between open and close positions, and wherein said switching apparatus further comprises:
   a movable plate provided with n openings allowing the n rods to pass through the plate, the openings of the plate and cross sections of the n rods having cooperating shapes allowing the course of a maximum of n−1 third vacuum interrupters into the open position; and
   a controllable plate motor for rotating the plate in different operating positions perpendicularly to the n rods to determine which of the n−1 third vacuum interrupters are allowed to move in the open position;
   wherein the at least one third controllable motor is for moving the plate in parallel to the rods consequently moving said n−1 third vacuum interrupters between open and close positions thereby preventing at any time a complete opening of the phase line.

8. A switching apparatus according claim 1, further comprising:
   at least one second vacuum interrupter connected in parallel respectively with the at least one first vacuum interrupter; and
   at least one second controllable motor for selectively opening and closing the at least one second vacuum interrupter, the at least one second controllable motor being controlled by the controller.

9. A switching apparatus according to claim 4, further comprising, for each of the second controllable motors:
   a dedicated contactless power supply for supplying an electricity supply from the phase line;

a rectifier for rectifying the electricity supply;

a capacitor for storing electrical energy from an output of the rectifier; and a controllable switch for discharging the capacitor into the corresponding second controllable motor to close said second controllable motor, upon reception of a control signal from the controller.

10. A switching apparatus according to claim 1, further comprising at least one electronic switch connected in parallel respectively with the at least one first vacuum interrupter, the at least one electronic switch being controlled by the controller.

11. A switching apparatus according to claim 1, comprising a main contactless power supply for supplying an electricity supply from the phase line.

12. A switching apparatus according to claim 9, comprising a main contactless power supply for supplying an electricity supply from the phase line.

13. A switching apparatus according to claim 11, wherein the main contactless power supply comprises a capacitive power supply.

14. A switching apparatus according to claim 11, wherein the main contactless power supply comprises an inductive power supply.

15. A switching apparatus according to claim 13, comprising a converter for converting the electricity supply from the phase line into DC supply.

16. A switching apparatus according to claim 1, comprising a power line communication system connected to the controller for communication through the phase line, and a high frequency emitter/receiver router connected to the controller for wireless communication.

17. A switching apparatus according to claim 1, comprising a global positioning system for locating the switching apparatus via satellite and for timing purposes.

18. A switching apparatus according to claim 1, comprising a memory and a housing for protecting the memory, the memory being connected to the controller for storing parameters representative of current and past activities of the switching apparatus and of the phase line.

19. A switching apparatus according to claim 9, comprising a power line communication system connected to the controller for communication via the phase line, and a high frequency emitter/receiver router connected to the controller for wireless communication, wherein the controller has a detector for detecting a malfunction in the high frequency emitter/receiver router and the power line transmission system, and a command generator for generating said control signal upon detection of said malfunction to close at least one of the corresponding second vacuum interrupters.

20. A switching apparatus according to claim 12, wherein the controller has a detector for detecting a malfunction in the main contactless power supply, and a command generator for generating said control signal upon detection of said malfunction to close at least one of the corresponding second vacuum interrupters.

21. A switching apparatus according to claim 1, wherein each vacuum interrupter is provided with a mechanical shield for protecting the environment of the vacuum interrupters.

22. A switching apparatus according to claim 4, wherein the controller has an input for detecting a malfunction in the at least one first vacuum interrupter, and a command generator for commanding the at least one second controllable motor to close the at least one second vacuum interrupter upon detection of said malfunction of the at least one first vacuum interrupter.

23. A switching apparatus according to claim 1, wherein each controllable motor is selected in the group comprising: a single phase linear motor, a polyphase linear motor and a regular motor provided with a lead screw.

24. A switching module for varying impedances of two phase lines of two adjacent segments of an electrical power line, the switching module comprising two switching apparatus each comprising:

at least one first vacuum interrupter connected in series with at least one of the conductors of the corresponding phase line; each phase line including n conductors electrically insulated from each other and short-circuited together at two ends of the segment, n being equal to or greater than 2;

at least one first controllable motor for selectively opening and closing the at least one vacuum interrupter;

a detector for detecting a parameter representative of current operating conditions of the corresponding phase line; and a controller for controlling the at least one first controllable motor according to the parameter detected by the detector, the two switching apparatus being mounted back to back.

25. A switching apparatus according to claim 1, comprising a housing having a lateral conducting wall and first, second, third, fourth and fifth conducting plates transversal to the lateral wall and which separate the housing into first, second, third and fourth compartments; the first conducting plate being provided with an insulating element for electrical insulation from the lateral wall, the second, third, fourth and fifth conducting plates being electrically connected to the lateral wall; the first, second, third and fourth conducting plates being electrically connected to the conductors and the fifth conducting plate being insulated from the conductors; the first and second conducting plates delimiting the first compartment which comprises at least one central conductor connecting the first and second plates, and transformers located around the central conductor for informing the controller of the current flowing through the central conductor; the second and third plates delimiting the second compartment which includes the controller and a contactless power supply for supplying an electricity supply from the phase line; the third and fourth plates delimiting the third compartment which includes the at least one first controllable motor; the fourth and fifth plates delimiting the fourth compartment which includes the at least one first vacuum interrupter.

26. A switching apparatus according to claim 12, comprising a housing having a lateral conducting wall and first, second, third, fourth and fifth conducting plates transversal to the lateral wall and which separate the housing into first, second, third and fourth compartments; the first conducting plate being provided with an insulating element for electrical insulation from the lateral wall; the second, third, fourth and fifth conducting plates being electrically connected to the lateral wall; the first, second, third and fourth conducting plates being electrically connected to the conductors and the fifth conducting plate being insulated from the conductors; the first and second conducting plates delimiting the first compartment which comprises at least one central conductor connecting the first and second plates, and transformers located around the central conductor for informing the controller of the current flowing through the central conductor; the second and third plates delimiting the second compartment which includes the controller and the dedicated and main contactless power supplies; the third and fourth plates delimiting the third compartment which includes the controllable motors; the fourth and fifth plates delimiting the fourth compartment which includes the vacuum interrupters.

27. A switching apparatus according to claim 4, wherein each of the second controllable motors comprises a stabilizing device for stabilizing the position of the second controllable motor in open or closed position; a spring for urging the second interrupter into a closed position; and a lock for holding the spring in a compressed position to keep the interrupter in open position.

28. A switching apparatus according to claim 25, wherein the housing is provided with openings at lower and upper portions thereof for ventilation, and is provided with thermal insulating material to prevent overheating inside the housing from solar radiation.

29. A switching apparatus according to claim 3, comprising an emergency light connected between the four conductors.

30. A method for varying an impedance of a phase line of a segment of an electrical power line, the method comprising steps of:
  a) providing at least one first vacuum interrupter connected in series with at least one conductor of the phase line; the phase line including n of the conductors electrically insulated from each other, n being equal to or greater than 2, the n conductors being short-circuited together at two ends of the segment;
  b) providing at least one first controllable motor for selectively opening and closing the at least one first vacuum interrupter;
  c) detecting a parameter representative of current operating conditions of the phase line; and
  d) controlling the at least one first controllable motor according to the parameter detected in step c).

31. A method according to claim 30, further comprising steps of:
  e) providing at least one second vacuum interrupter connected in parallel respectively with the at least one first vacuum interrupter; and
  f) selectively opening and closing the at least one second vacuum interrupter by means of at least one second controllable motor, the at least one second controllable motor being controlled by the controlling of step d);
  the method further comprising, for each of the second controllable motors, steps of:
  g) providing a dedicated contactless power supply for supplying an electricity supply from the phase line;
  h) rectifying the electricity supply;
  i) storing electrical energy from an output of the rectifier by means of a capacitor; and
  j) discharging the capacitor into the corresponding second controllable motor to close said second controllable motor, upon reception of a control signal generated from the controlling of step d).

32. A method according to claim 30, comprising steps of providing a power line communication system for communication via the phase line, providing a high frequency emitter/receiver router for wireless communication, detecting a malfunction in the high frequency emitter/receiver router and the power line transmission system, and generating said control signal upon detection of said malfunction.

33. A method according to claim 31, further comprising steps of detecting a malfunction in an electricity supply, and generating said control signal upon detection of said malfunction.

34. A method according to claim 31, further comprising steps of detecting a malfunction in the at least one first vacuum interrupter or in the electrical power line, and commanding the at least one second controllable motor to close the at least one second vacuum interrupter upon detection of said malfunction.

35. A method according to claim 30, further comprising steps of:
  e) providing at least one second vacuum interrupter connected in parallel respectively with the at least one first vacuum interrupter; and
  f) selectively opening and closing the at least second vacuum interrupter by means of at least one second controllable motor, the at least one second controllable motor being controlled by the controlling of step d); the method wherein step c) further comprises a step of detecting whether the vacuum interrupters that should be opened in response to the controlling of step d) are opened, and emitting a warning signal when it is not the case; and the step d) of controlling further comprises a step of sending an oscillating command signal for the interrupters that are subject to a warning signal to force open the interrupters in question.

36. A method according to claim 31, wherein the detecting of step c) comprises a step of detecting a short-circuit current, and step d) further comprises a step of applying additional currents into the second controllable motors to reduce resistance of closing contacts of the second vacuum interrupters.

* * * * *

UNITED STATES PATENT AND TRADEMARK OFFICE
CERTIFICATE OF CORRECTION

PATENT NO. : 7,639,460 B2  
APPLICATION NO. : 11/628028  
DATED : December 29, 2009  
INVENTOR(S) : Couture et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 405 days.

Signed and Sealed this

Ninth Day of November, 2010

David J. Kappos  
*Director of the United States Patent and Trademark Office*